Dec. 1, 1970  R. R. CANDOR ET AL  3,543,408
LIQUID REMOVING APPARATUS AND METHOD
Filed Oct. 21, 1968  8 Sheets-Sheet 1

INVENTORS
ROBERT R. CANDOR &
JAMES T. CANDOR

THEIR ATTORNEYS

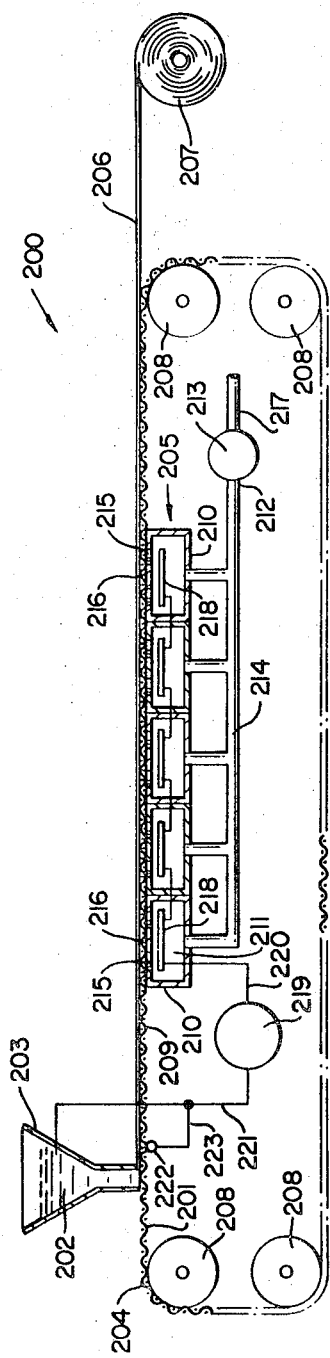
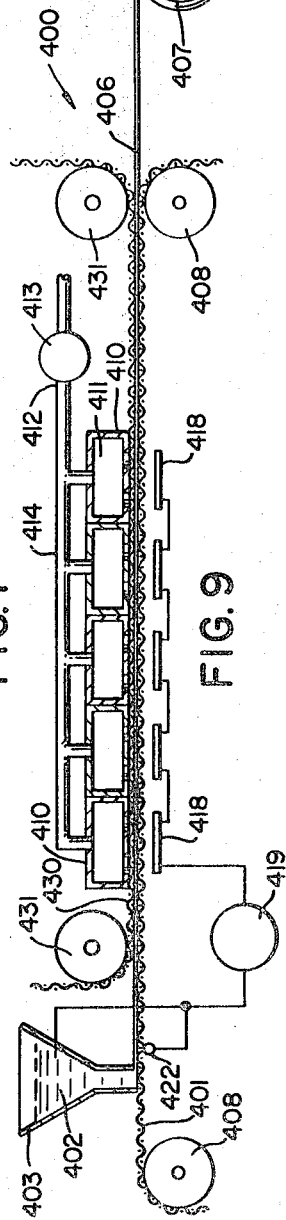
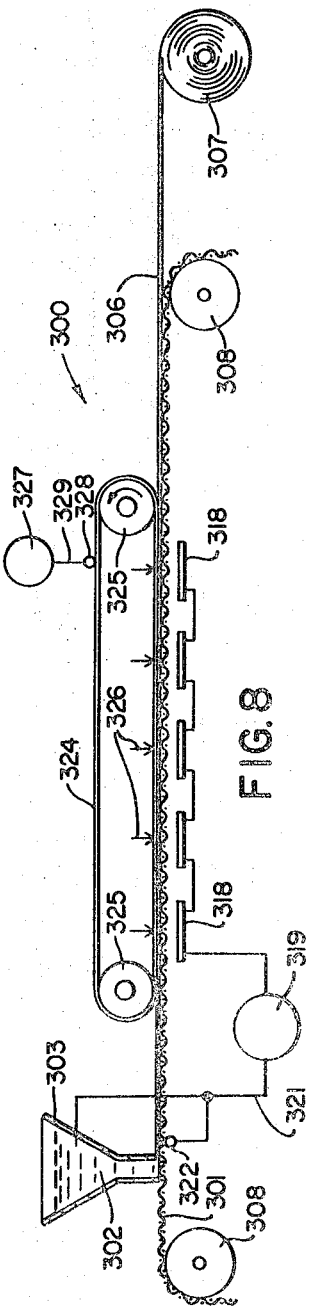

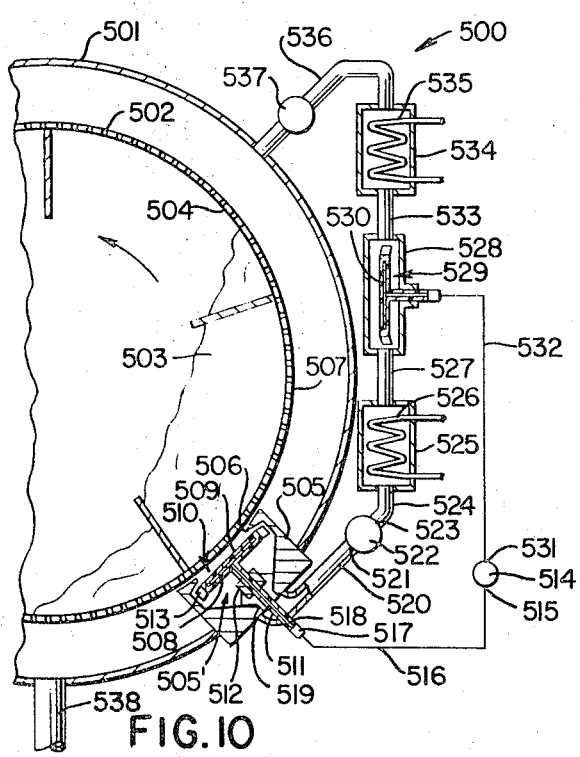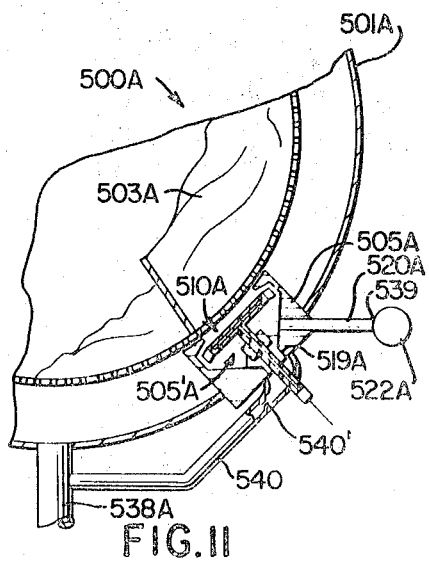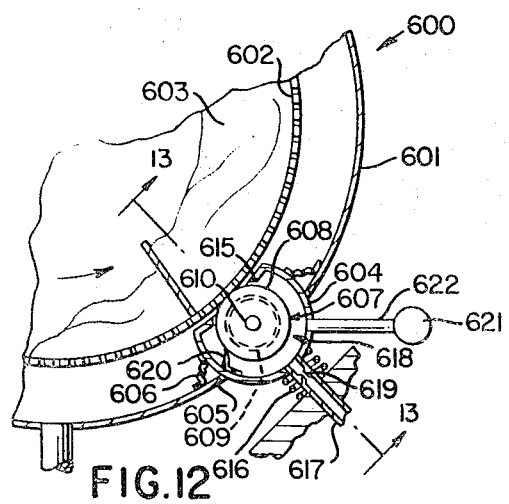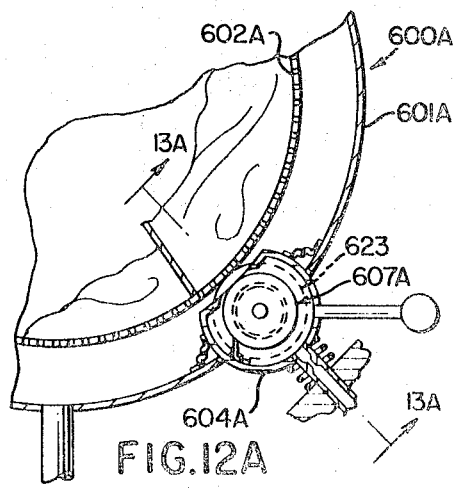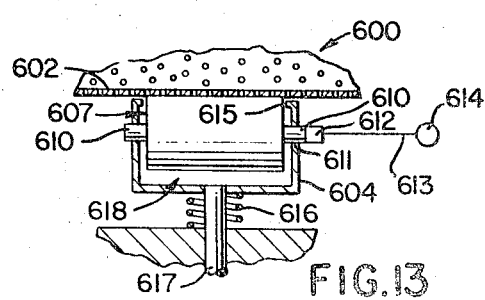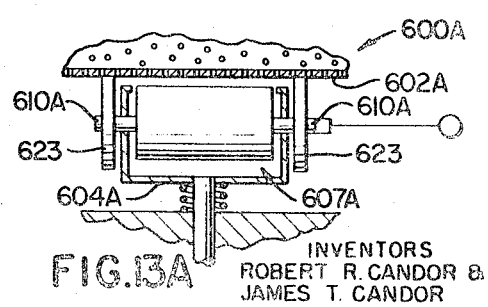

Dec. 1, 1970    R. R. CANDOR ETAL    3,543,408
LIQUID REMOVING APPARATUS AND METHOD
Filed Oct. 21, 1968    8 Sheets-Sheet 5
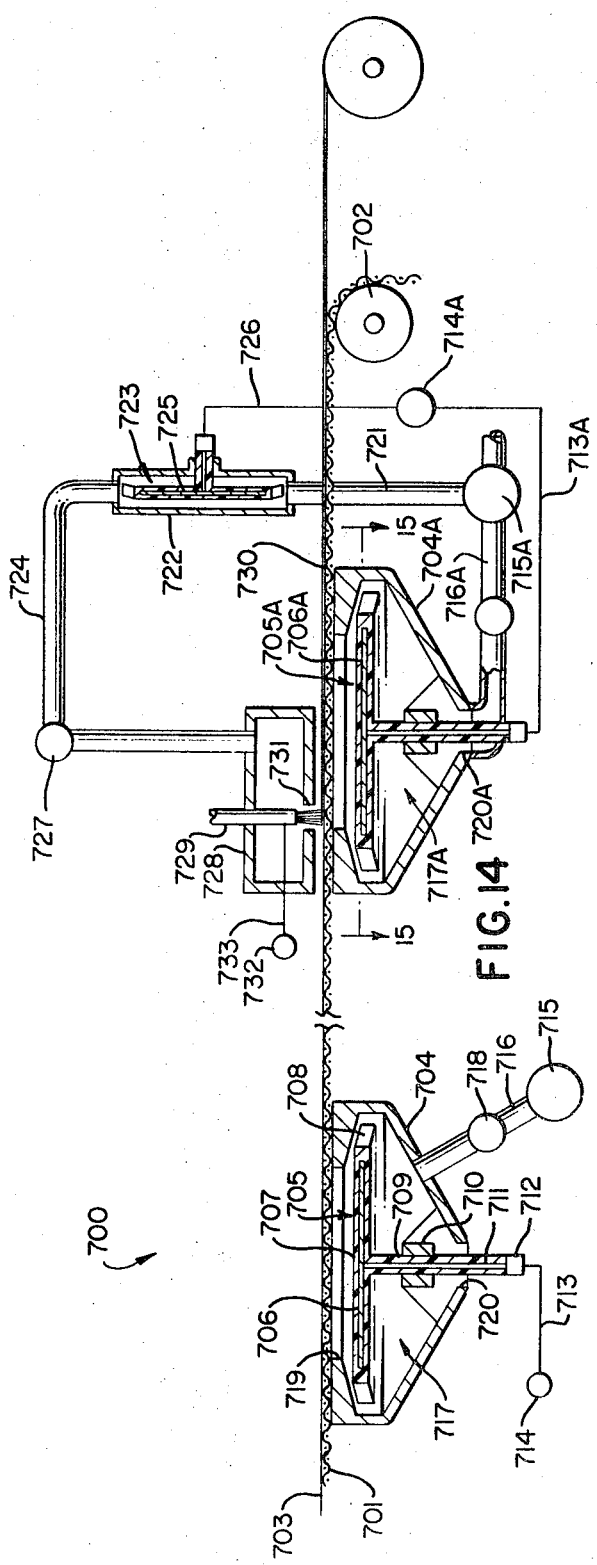
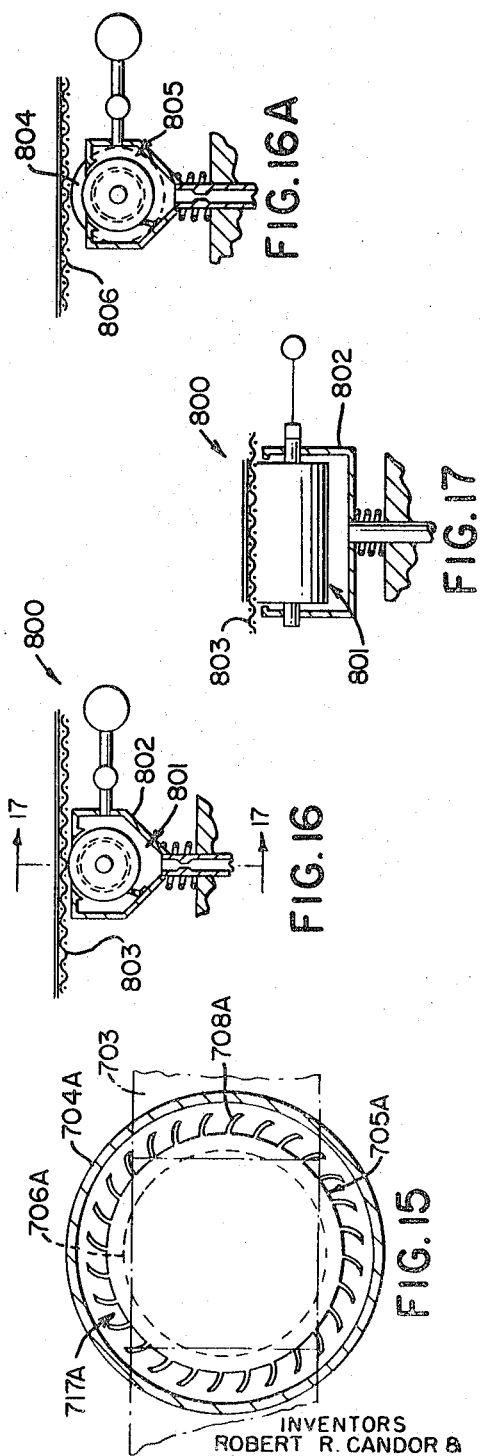
INVENTORS
ROBERT R. CANDOR &
JAMES T. CANDOR
Candor & Candor
THEIR ATTORNEYS

INVENTORS
ROBERT R. CANDOR &
JAMES T. CANDOR

THEIR ATTORNEYS

Dec. 1, 1970  R. R. CANDOR ET AL  3,543,408
LIQUID REMOVING APPARATUS AND METHOD
Filed Oct. 21, 1968  8 Sheets-Sheet 8

INVENTORS
ROBERT R. CANDOR &
JAMES T. CANDOR
BY
*Candor & Candor*
THEIR ATTORNEYS United States Patent Office 3,543,408
Patented Dec. 1, 1970

3,543,408
LIQUID REMOVING APPARATUS AND METHOD
Robert R. Candor, 5940 Munger Road, Miami Township, Ohio 45459, and James T. Candor, 5440 Cynthia Lane, Washington Township, Ohio 45429
Continuation-in-part of application Ser. No. 748,298, July 29, 1968, which is a continuation-in-part of application Ser. No. 696,639, Jan. 9, 1968, which is a continuation-in-part of application Ser. No. 639,354, May 18, 1967, which is a continuation-in-part of application Ser. No. 532,266, Mar. 7, 1968, which in turn is a continuation-in-part of application Ser. No. 219,587, Aug. 29, 1962. This application Oct. 21, 1968, Ser. No. 769,155
Int. Cl. B01k 5/00
U.S. Cl. 34—1                                     32 Claims

ABSTRACT OF THE DISCLOSURE

This disclosure relates to a laundry apparatus, paper making apparatus or the like wherein the moisture in the wet laundry, paper slurry or the like, disposed therein is removed by an electrostatic means that provides a nonuniform field between the moisture in the laundry, paper slurry or the like and an electrode means to tend to cause the moisture to leave the laundry, paper slurry or the like and move toward the electrode means where the higher intensity portion of the nonuniform field is located. Such electrode means can be disposed in a nozzle which tends to provide a localized and controlled atmosphere about the electrode means.

---

This application is a continuation-in-part of its copending patent application, Ser. No. 748,298, filed July 29, 1968, which, in turn, is a continuation-in-part of its copending patent application, Ser. No. 696,639, filed Jan. 9, 1968, now abandoned, which, in turn, is a continuation-in-part of its copending patent application, Ser. No. 639,354, filed May 18, 1967, now Pat. No. 3,405,452, which, in turn, is a continuation-in-part of its copending patent application, Ser. No. 532,266, filed Mar. 7, 1968, now Pat. No. 3,330,136, which, in turn, is a continuation-in-part of its copending patent application, Ser. No. 219,587, filed Aug. 27, 1962, now Pat. No. 3,238,750.

This invention relates to an improved laundry machine, paper making apparatus and the like and to an improved method for treating laundry, paper and the like.

In particular, one embodiment of this invention comprises a substantially airtight and noncollapsible confining means or structure having a rotatable foraminous carriage being adapted to support laundry or the like therein. Means are provided for selectively reducing and maintaining the air pressure inside the confining means at any selected pressure below the air pressure outside of the confining means.

In this manner, when the laundry machine is being utilized as a drying machine for removing moisture from wet laundry disposed in the foraminous carriage, the moisture in the wet laundry more readily evaporates in the reduced atmosphere in the confining means than it would evaporate if the confining means contained air at normal atmospheric conditions.

By heating the reduced atmosphere in the confining means to a temperature to cause the moisture in the wet laundry to boil, more rapid evaporation is effected without having to raise the temperature thereof to the normal boiling point of the moisture. In this same vein, auxiliary heating means can be dispensed with if the air pressure in the confining means is lowered to such an extent that the latent heat of the wet laundry is sufficient to cause the moisture to boil at the reduced atmospheric conditions.

When the laundry machine is being utilized to treat laundry with water or the like, the atmosphere in the confining means can be lowered to such an extent that the latent heat of the water causes it to boil whereby the bubbling action of the boiling water further enhances the treating of the laundry by the water or the like disposed in the laundry machine. In this same vein, auxiliary heating means may be utilized to supplement the raising of the temperature of the water to boil at the reduced air pressure.

In addition, electrostatic means of this invention can be utilized in combination with the previously described suction means or by itself to remove liquid from the wet laundry.

Therefore, it can be seen that the apparatus of this invention can be a washing machine, a drying machine, or a combination washing and drying machine and is thus designated as a "laundry machine" but may have uses other than operating on laundry and is not to be limited to such use. For example, the same can be utilized for a dry cleaning machine, etc.

Further, one of the features of this continuation-in-part application is to illustrate, describe and claim how certain of the previously described features of the electrostatic means, with or without the previously described suction means, can be utilized in improving the making of paper or the like.

Accordingly, it is an object of this invention to provide an improved moisture removing apparatus having one or more of the novel features set forth above as hereinafter shown or described.

Another object of this invention is to provide an improved method for removing moisture and the like having one or more of the novel features set forth above or hereinafter shown or described.

Other objects, uses and advantages of this invention are apparent upon a reading of this description which proceeds with reference to the accompanying drawings forming a part thereof and wherein:

FIG. 7 is a schematic view illustrating one embodiment of the paper making apparatus and method of this invention.

FIG. 8 is a view similar to FIG. 7 and illustrates another embodiment of this invention.

FIG. 9 is a view similar to FIG. 7 and illustrates still another embodiment of this invention.

FIG. 10 is a view similar to FIG. 3 and illustrates another embodiment of the laundry apparatus of this invention.

FIG. 11 is a view similar to FIG. 10 and illustrates another embodiment of the laundry apparatus of this invention.

FIG. 12 is a view similar to FIG. 11 and illustrates another embodiment of the laundry apparatus of this invention.

FIG. 12A is a view similar to FIG. 12 and illustrates another embodiment of the laundry apparatus of this invention.

FIG. 13 is a fragmentary cross-sectional view taken substantially on line 13—13 of FIG. 12.

FIG. 13A is a fragmentary cross-sectional view taken on line 13A—13A of FIG. 12A.

FIG. 14 is a view similar to FIG. 7 and illustrates another paper making apparatus and method of this invention.

FIG. 15 is a fragmentary view taken substantially on line 15—15 of FIG. 14.

FIG. 16 is a fragmentary view similar to FIG. 14 illustrating another paper making apparatus of this invention.

FIG. 16A is a view similar to FIG. 16 and illustrates another paper making apparatus of this invention.

FIG. 17 is a cross-sectional view taken on line 17—17 of FIG. 16.

Figure 1:
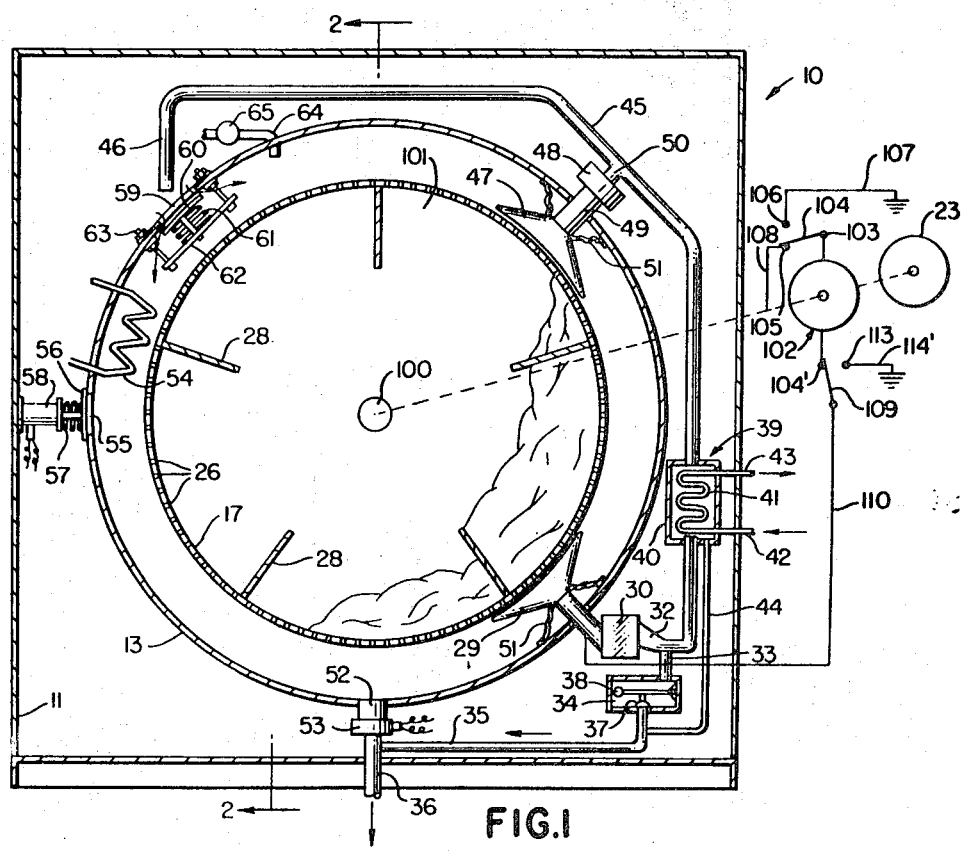
FIG. 1 is an axial cross-sectional view of an improved laundry machine of this invention.
Figure 2:
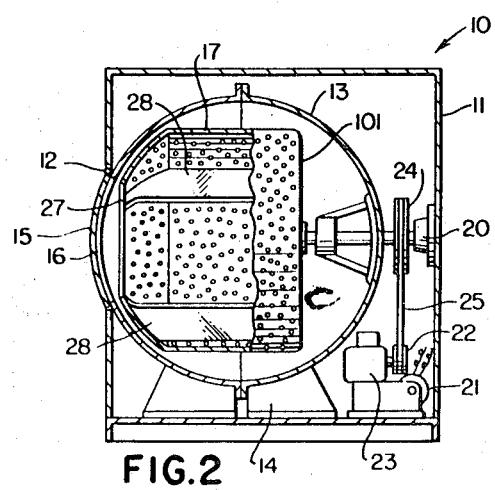
FIG. 2 is a reduced cross-sectional view of the machine illustrated in FIG. 1 and is taken on line 2—2 thereof.

Referring now to FIGS. 1 and 2, an improved laundry machine of this invention is generally indicated by the reference numeral 10 and comprises an outer frame or casing 11 having an opening 12 for the passage of laundry and the like into and out of the machine 10.

A substantially airtight, stationary drum 13 is disposed in the casing 11 and is supported therein by suitable supports 14. The drum 13 may have any desired configuration other than the spheroidal configuration illustrated, the important feature being that the drum 13 will not collapse when the air pressure inside the drum 13 is lowered to the desired pressure in a manner and for a purpose hereinafter described.

The drum 13 has an opening 15 provided therein for the passage of laundry and the like into and out of the drum 13. A suitable door 16 is hingedly mounted to the drum 13 and is adapted to open and close the opening 15 in the drum 13, the door 16, when in the closed position, being substantially airtight and noncollapsible.

A foraminous carriage 17 is disposed in the drum 13 and is carried on a shaft 18 passing through the drum 13 and rotatably supported in bearings 12 and 20, respectively, carried by the drum 13 and the casing 11. In this manner, the carriage 17 can be rotated in the drum 13 by a motor 21 driving a pulley 22 through a reducer 23, the pulley 22 being interconnected to a pulley 24 carried on the shaft 18 by a suitable belt drive 25 or the like.

The carriage 17 has a plurality of openings 26 passing therethrough, the openings 26 being large enough to readily permit the passage of water or air or both therethrough.

An opening 27 is formed in one end of the carriage 17 to permit the passage of laundry into and out of the carriage 17, the opening 27 being aligned with the openings 15 and 12 provided respectively in the drum 13 and casing 11.

Suitable baffles 28 are carried on the inside peripheral surface of the carriage 17 to lift clothes on the rising side of the carriage 17 as the carriage rotates.

A suction nozzle 29 is disposed between the carriage 17 and drum 13 and is operatively interconnected to the inlet side of a suitable suction pump 30 by a conduit means 31.

The suction nozzle 29 has its open end disposed adjacent the outer peripheral surface of the carriage 17 and can extend completely across the carriage 17 or partially across the same, as desired. Further, the nozzle 29 may be movable toward and away from the carriage 17 in any of the manners set forth in the copending application, Ser. No. 839,232, filed Sept. 10, 1959, and entitled, "Laundry Machine."

In any event, the suction pump 30, when operating, is adapted to suck moisture and air from wet laundry disposed in the carriage 17 directly through the foraminous carriage 17 into the nozzle 20 and, thus, into the inlet side of the pump 30 in a manner more fully described hereinafter.

The moisture, vapor and air drawn from the drum 13 is formed out of the outlet side of the pump 30 into a conduit means 32 which decreases in cross-sectional area to cause the air delivered by the pump 30 to be compressed in the conduit means 32 and, thereby, give up at least part of its moisture into the conduit means 32.

The moisture present in the conduit means 32 flows downwardly through a conduit 33 into a compartment 34, the bottom of the compartment being interconnected to a conduit 35 leading to a drain conduit 36.

A suitable float valve 37 is disposed in the compartment 34 and normally closes off the conduit 35. However, as the moisture collects in the compartment 34, the rising level of the moisture floats the float 38 upwardly to open the valve 37 and let part of the moisture in the compartment flow to the drain 36.

In this manner, the compressed air in the conduit 32 does not pass to drain 36 because there is always a certain amount of moisture covering the inlet of the conduit 35.

The conduit means 32 lead to a suitable condenser 39 comprising a compartment 40 having a cooling coil 41 disposed therein. Suitable cooling means, such as water and the like, can enter the coil 41 through the inlet 42 and be expelled out through the outlet 43.

In this manner, the air being forced into the compartment 40 from the conduit 32, passes over the cooling coil 41 whereby any vapor in the air condenses and falls to the bottom of the compartment 40, the outlet end of the conduit 32 being disposed above the bottom of the compartment 40 to prevent the condensed moisture from entering the conduit 32.

Condensed moisture in the compartment is fed to the conduit 35 by a conduit 44, the end of the conduit 44 disposed in the compartment 40 being below the free end of the conduit 32.

After the air passes over the cooling coil 41, the dried air can be expelled to the atmosphere or vented, as desired.

Alternately, the air can be fed from the cooling chamber 40 through a conduit 45 having an outlet end 46 so positioned for a purpose hereinafter described.

A second suction means can be carried by the machine 10 and can comprise a suction nozzle 47 disposed closely adjacent the carriage 17 and inside the drum 13, the nozzle 47 being interconnected to the inlet side of a suction pump 48 by a conduit 49.

The outlet side of the pump 48 is interconnected to the inlet side of a suction pump 48 by a conduit 49.

The outlet side of the pump 48 is interconnected to the conduit 45 by a branch conduit 50.

The conduits 31 and 49 pass through the drum 13 and have flexible sealing means 51 connected thereto and to the drum 13 to prevent air and water leakage from drum 13 into the housing 11.

The interior of the drum 13 is interconnected to the drain conduit 36 by a conduit 52, the conduit 52 having a suitable solenoid operated valve 53 therein.

An electrical heater 54 is disposed between the drum 13 and carriage 17 and is operated in a conventional manner.

The drum 13 has an opening 55 formed therein which is controlled by a valve member 56 normally urged to the closed position by a spring 57. The valve member 56 is moved to the opened position thereof by the energization of a solenoid 58.

Another opening 59 is formed in drum 13 adjacent the outlet 46 of the conduit 45, the opening 59 being controlled by a valve member 60 normally being urged to its closed position by a spring 61 disposed between the valve member 60 and a support 62 adjustably carried on bolts 63 attached to the drum 13.

In this manner, the force of the compression spring 61 tending to hold the valve member 60 in the closed position thereof can be selectively varied.

Water is adapted to be fed into the drum 13 by a conduit 64 having conventional valve means 65.

The operation of the laundry machine 10 will now be described.

Soiled laundry or the like and soap or detergent are introduced into the carriage 17 of the laundry machine 10 through the door 15 in a conventional manner.

Thereafter, the door 15 is closed and wash water of the desired temperature is adapted to be introduced into the drum 13 through the conduit 64, the valve means 65 and 53 being selectively operated to permit the water introduced into the drum 13 to rise to the desired level.

Thereafter, the carriage 17 is rotated to cause a tumbling action of the clothes through the wash water in a conventional manner.

During this washing cycle, the solenoid 59 can be operated to open the valve member 56 so that the washing action can take place with normal atmospheric conditions existing in the drum 13.

Alternately, one feature of this invention can be utilized during the washing cycle of the laundry machine 10.

In particular, the solenoid 58 can be so actuated that the valve member 56 is disposed in sealing relation against the opening 55 in the drum 13.

Thereafter, the suction pump 48 is operated to cause the suction nozzle 47 to tend to reduce the pressure of the air in the drum 13 below normal atmospheric conditions existing outside the drum 13.

By proper regulation of the force of the compression spring 61 acting on the valve member 60, the suction means 47 and the valve means 60 permits the air pressure inside the drum 13 to be reduced to and maintained at a selected pressure below normal atmospheric pressure.

The amount of reduction of the air pressure in the drum 13 coupled with the latent heat of the wash water will cause the wash water to boil even though the wash water is at approximately 140 degrees Fahrenheit or the like.

It is believed that this boiling action of the wash water during the wash cycle will enhance the dirt removing action of the wash water on the soiled laundry or the like.

While the heater 54 is illustrated as being in the upper region of the laundry machine 10 it is to be understood that the heater 54 can be disposed in the lower region thereof whereby the same will be submerged in the wash water so that the heater 54 can be utilized to heat up or maintain the temperature of the wash water at a selected temperature so that the suction means 47 can cause the wash water to continuously boil during the wash cycle.

Alternately, another heater could be utilized.

Thereafter, the wash water is drained through the drain 52 by opening the solenoid valve 53 in a conventional manner and opening the valve member 56.

Subsequently, one or more rinse cycles can be utilized whereby rinse water is introduced through the conduit 64 in much the same manner as the wash water and the carriage 17 is rotated to tumble the laundry through the rinse water.

During the rinsing cycle it may be desired to also use the suction means 47 to reduce the air pressure in the drum 13 below normal atmospheric pressure, and, in combination with the valve means 60, to maintain the air pressure in the drum 13 at a selected reduced air pressure.

Thus, the rinse water will also tend to bubble or boil, the rinse water either being hot itself or being heated by the heater means 54 as desired.

After the rinse water has been drained from the drum 13, the laundry machine 10 is now adapted to perform a drying operation.

After the water has been drained from the drum 13 by opening the valve means 53, the suction pump 30 is turned on whereby the suction nozzle 29 forms a sucking action on the clothes being accumulated in the carriage 17 to tend to draw moisture therefrom out to the outlet 32 as set forth in the aforementioned copending application.

During this drying action, the carriage 17 can be continously rotated to continuously bring new accumulations of clothes adjacent to the suction nozzle 29.

However, while the suction nozzle 29 is removing moisture from the wet laundry, the value means 56 can be closed and the suction means 29, in combination with the valve means 60, can reduce and maintain the air pressure in the drum 13 at a selected air pressure below the normal atmospheric air pressure outside the drum 13.

If the air pressure inside the drum 13 is reduced to such an extent that the latent heat of the wet laundry in combination with the reduced air pressure will cause the moisture in the wet clothes to more readily evaporate than if the air pressure was not reduced.

Further, the heater element 54 can be turned on whereby the air that is drawn through the valve means 60 passes over the heater 54 to heat up the wet laundry so that the moisture in the wet laundry more readily tends to evaporate in the reduced atmosphere produced in the drum 13.

Thus, as the moisture is being continuously withdrawn or sucked from the wet laundry by the suction means 29, the suction means 29 also cooperates with the valve means 60 to reduce and maintain the air pressure in the drum 13 at a selected reduced air pressure below the normal atmospheric air pressure outside the drum 13 to more readily evaporate the moisture from the wet laundry.

If desired, the suction means 47 can also be operating during this time to assist the nozzle in reducing the air pressure in the carriage 13.

Alternately, only the suction means 47 can be utilized during the drying action wherein the suction means 47 cooperates with the valve means 60 to reduce the air pressure in the drum 13 to such an extent that, in combination with either the heated air coming through the valve means 60 and over the heater element 54 or the latent heat of the wet laundry, the moisture in the wet laundry tends to readily evaporate and pass out through the suction nozzle 47 in the above manner.

If desired, the combination of the heat of the wet laundry and the reduced air pressure can be so arranged that moisture in the wet laundry actually boils at a low temeprature that will not adversely affect the laundry.

Therefore, it can be seen that the method and apparatus of this invention not only provides improved means for treating laundry or the like with water or the like by causing the water to boil or bubble, but also the method and apparatus of this invention provides improved means for removing moisture from wet laundry by a suction action and/or by an evaporative action for drying the laundry.

After the laundry has been dried in the above manner, the operation of the machine 10 is terminated and the dry laundry can be removed from the laundry machine 10 in the conventional manner.

While the above operation of the laundry machine 10 has been described as being a continuous operation, it is to be understood that each of applicants' novel features can be separately used or in various combinations thereof in other laundry machines or the like.

For example, applicants' drying apparatus need not be utilized with a washing machine and conversely, applicants' washing apparatus may not be utilized with a drying machine.

While the laundry machine 10 has been described as completely drying the wet laundry, it is to be understood that the drying operations of applicants' invention can be utilized merely for removing enough moisture from the wet laundry thereof for the desired purposes whereby the conventional centrifuging operation can be eliminated.

Another embodiment of this invention is generally indicated by the reference numeral 10A and parts thereof similar to the embodiment of FIG. 1 are indicated by like reference numerals followed by the reference letter "A."

Figure 3:
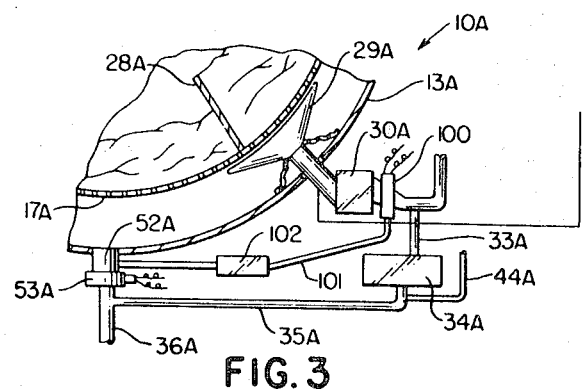
FIG. 3 is a view similar to FIG. 1 and illustrates another embodiment of this invention.

As illustrated in FIG. 3 the pipe 32A has a solenoid operated valve 100, which, when energized during the wash cycle, prevents the outflow from the suction means 30A from passing beyond the valve means 100 and directs the outflow of the suction means 30A into a pipe 101 leading to the drain pipe 52A above the valve means 53A, the pipe 101 having a filter means 102 therein. When the valve 100 is deenergized, the valve closes the pipe 101 from the outflow of the suction means 30A and permits the outflow from the suction means 30A to pass beyond the valve means 100 into the pipe 32A for the moisture removal cycle previously described.

When the machine 10A is being utilized in the wash cycle thereof, the suction means 30A is turned on and the valve means 100 is energized whereby the suction means causes a large volume of the body of wash water in the confining means 13A to be drawn through the laundry on the foraminous carriage 17A and through the foraminous carriage 17A into the nozzle inlet means 29A and suction means 30A and, by means of the valve means 100, through the pipe 101 and filter 102 back to the confining means 13A because the valve means 53A is closed below the pipe 101 at the drain pipe 52A.

In this manner, the suction means 30A causes the wash water to thoroughly wash the laundry as the carriage 17A is rotating because a large volume of wash water is being forced through the laundry into the aligned nozzle means 29A, the filter 102 removing dirt and lint from the wash water before it is returned to the confining means 13A. This wash cycle can also be accomplished with the other features of the washing operation of the machine 10 previously described. Of course, the rinsing operation could be the same for the machine 10A as the described wash cycle therefor.

When the machine 10A performs its moisture removal cycle, the valve means 100 is deenergized and the valve 53A is opened whereby the body of liquid drains out of the confining means 13A through the pipe 36A. Thereafter, the suction means 30A is utilized in the same manner as the suction means 30 previously described for the moisture removal and/or drying operation for the wet laundry remaining in the confining means 13A.

While the apparatus 10 and 10A are previously described as relying on the large volume of air being drawn through the laundry and foraminous portions 17 and 17A into the nozzle inlet means 29 and 29A to remove the moisture from the laundry for a drying operation, it is to be understood that such moisture removal portion can be assisted by an electrostatic feature of this invention.

As illustrated in FIG. 1, the motor means 23 of FIG. 2 is illustrated schematically in FIG. 1 for rotating a shaft means 100 of the apparatus 10 that is interconnected to the end wall 101 of the foraminous carriage 17 so as to be in electrical conductive relationship with the carriage 17 while being electrically insulated from its surrounding tub 13 and frame means 11 as well as from the motor 23 as will be apparent hereinafter.

The shaft 100 rotates an electrostatic machine or apparatus 102 in unison with its rotation of the foraminous drum 17 whereby the electrostatic device 102 creates a differential between two terminal means 103 and 104' thereof when the shaft 100 is rotated by the motor 23 in a manner well known in the art.

A switch blade 104 is electrically interconnected to the terminal 103 of the electrostatic device 102 and is adapted to be moved between terminals 105 and 106, the terminal 106 being interconnected to the ground by a lead 107 and the terminal 105 being interconnected to the conductive portion of the shaft 100 by a lead 108.

Figure 4:
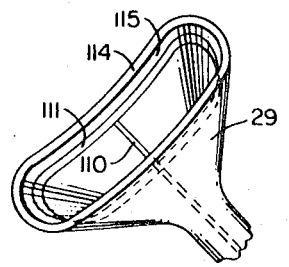
FIG. 4 is a fragmentary perspective view of a typical nozzle means for the apparatus of FIG. 1 or 3 and illustrates the electrode means therefor.
Figure 5:
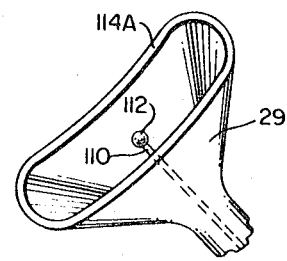
FIG. 5 is a view similar to FIG. 4 and illustrates another embodiment of this invention.

Another switch blade 109 is provided and is electrically interconnected by a lead 110 to an electrode means inside the suction nozzle means 29, such as the electrode means 111 of FIG. 4 or electrode means 112 of FIG. 5. The switch blade 109 is movable between the terminal 104' of the electrostatic machine 102 and a terminal 113 interconnected to ground by a lead 114'.

The electrode means 111 for the nozzle means 29 of FIG. 4 is recessed below the opened end 114 thereof and extends completely around the inside peripheral surface 115 thereof, the electrode 111 being completely electrically insulated from the nozzle means 29 in any suitable manner, such as by forming the nozzle means 29 from a non-conductive material. However, in the embodiment of FIG. 5, the electrode 112 is disposed centrally in the open end 114A of the nozzle 29 while being recessed below the open end 114A and also being suitably electrically insulated from the nozzle means 29 of the supporting lead means 110.

The operation of the apparatus 10 utilizing the electrostatic means 102 will now be described in connection with a drying operation.

After the laundry has been washed in the manner previously described and the body of treating liquid has been removed through the drain 52 in the manner previously described, the durm 17 is rotated by the motor 23 and tumbles the laundry in the drum 17 while the pump 30 is being operated to tend to draw a large volume of fluid through the laundry and foraminous surface 17 into the nozzle inlet means 29 for the drying operation previously described.

During this drying operation, the switch blades 109 and 104 are either manually or automatically moved from their respective ground terminals 113 and 106 against the terminals 104' and 105 to create a potential differential between the drum 17 and the electrode means 111 or 112 of the suction nozzle means 29. Because a potential differential now exists between the electrode 111 or 112 of the nozzle means 29 and the moisture in the laundry being tumbled in the rotating drum 17, not only does the large volume of air being directed into the nozzle inlet means 29 through the laundry and foraminous portion 17 by the pump 30 cause the moisture in the laundry to enter the nozzle inlet means 29 in the manner previously described, but also the potential differential between the moisture in the laundry and the electrode 111 or 112 of the nozzle means 29 causes the moisture to enter the nozzle means 29 in a manner believed to be at a faster rate than if the electrostatic device 102 was not utilized.

Further, by providing the foraminous drum 17 with a potential by the electrostatic device 102, such potential is also created for the moisture in the laundry as the same comes into contact with the drum 17 so that a relatively large potential differential is created between the moisture in the layer of laundry disposed against the drum 17 and the electrode 111 or 112 of the nozzle means 29 when that particular layer of laundry comes into alignment with the nozzle inlet opening 114 or 114A to cause the moisture to pass from the laundry through the foraminous surface 17 into the nozzle inlet means 29.

Of course, in the above operation of the apparatus 10, when utilizing the electrostatic device 102, the electrostatic device could still create such potential differential with only the switch blade 109 disposed against the terminal 104' and the switch blade 104 being connected to the terminal 106 leading to the ground so that the drum 17 need not be charged by the electrostatic device 102 to still accomplish the electrostatic moisture removal operation set forth above.

While the apparatus 10 has been described as requiring or utilizing the electrostatic device 102 in combination with the suction pump 30, it may be found that the suction means 30 can be completely eliminated and that moisture removal can be provided solely by electrostatic means.

Figure 6:
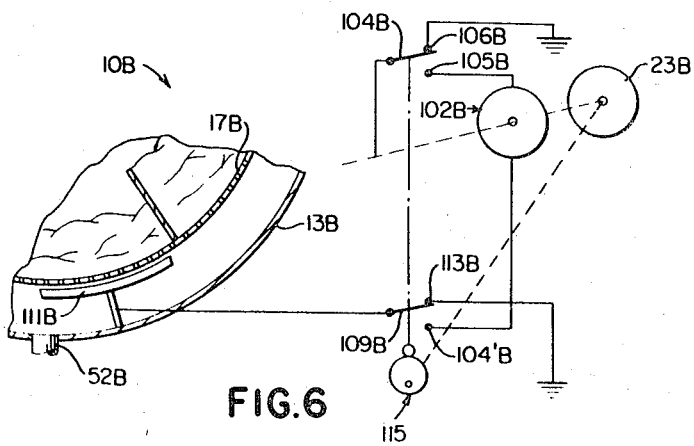
FIG. 6 is a view similar to FIG. 3 and illustrates still another embodiment of this invention.

For example, another embodiment of this invention is generally indicated by the reference numeral 10B in FIG. 6 and parts thereof similar to the apparatus 10 of FIG. 1 are indicated by like reference numerals followed by the reference letter "B."

As illustrated in FIG. 6, the foraminous drum 17B is rotated by the electric motor means 23B which also drives the electrostatic device 102B in the manner previously described and being adapted to have its terminals 104'B and 105B respectively interconnected to an electrode means 111B and the foraminous drum 17B by switch blades 109B and 104B.

However, the electrode means 111B is not disposed in a nozzle means 29 in the manner previously described and merely comprises a relatively large plate disposed closely adjacent the rotating drum 17B. The switch blades 109B and 104B are adapted to be cycled in unison between the terminals 113B and 106B leading to ground and the terminals 104'B and 105B leading to the electrostatic device 102B by a casing arrangement 115 driven by the motor means 22B.

In this manner, both the plate means 111B and drum 17B will be cycled by the cam means 115 to ground and to the electrostatic device 102B to respectively have a like potential differential.

When the plate 111B is cycled to the ground, any moisture being retained thereon by the charged plate 111B would immediately run off the same by gravity and pass out of the tub 13B through the drain means 52B. However, when the potential differential is created between the plate 111B and the moisture in the laundry being tumbled by the rotating drum 17B, such potential differential causes the moisture in the tumbled laundry to be attracted to the plate 111B and pass out of the laundry and through the drum 17B as the laundry comes into alignment with the plate 111B.

Therefore, it can be seen that the improved features of this invention are to utilize either an electrostatic means by itself to remove moisture from wet laundry or the like or in combination with a suction device that also removes the moisture by tending to draw a large volume of air through the laundry and into a suction nozzle means. Also, it may be found that when the suction nozzle means is utilized in combination with the electrostatic means, the suction power required may be less than without the electrostatic means and the nozzle means may not be required to be in sealed relation with the drum, but only closely adjacent thereto whereby no friction or nozzle wear-out problems will exist.

As previously stated, one of the features of this continuation-in-part application is to illustrate, describe and claim how certain of the previously described electrostatic features for removing liquid from moisture-bearing material can be readily utilized in improving the making of paper or the like.

Therefore, reference is now made to FIG. 7 wherein an improved paper making apparatus of this invention is generally indicated by the reference numeral 200 and comprises a continuously moving foraminous belt means 201 for receiving metered quantities of a paper slurry 202 from a supply means 203 thereof onto the side 204 to be carried in substantially sheet form from left to right and have the liquid therein removed by improved drying means, generally indicated by the reference numeral 205, of this invention so that the dried resulting paper sheet means 206 can be continuously drawn off the right-hand end of the foraminous belt means 201 to form a supply coil 207 thereof in a conventional manner.

While the continuously moving belt means 201 can be arranged in any suitable manner to carry the slurry 202 in sheet form or in individual sheet forms from the supply means 203 to the right, the arrangement illustrated in FIG. 7 comprises a continuous foraminous belt means 201 directed around suitable guide roller means 208 and being continuously driven in a clockwise direction by any suitable driving means (not shown).

The under surface 209 of the foraminous belt means 201 is adapted to pass over and in sliding contact with a plurality of conventional suction box means 210 which have the chambers 211 thereof fluidly interconnected to the inlet side 212 of a vacuum pump means 213 by suitable conduit means 214 whereby the suction created in the chambers 211 of the box means 210 acts through the foraminous belt means 209 at opening means 215 in the tops 216 of the box means 210 to tend to draw liquid out of the moving paper slurry sheet means 206 through the foraminous belt means 201 and into the inlet side 212 of the pump means 213 so as to be expelled out the outlet side 217 thereof.

In each suction box means 210 adjacent the top 216 thereof, but in spaced relation therefrom, is disposed an electrode means 218 adapted to have one potential imposed thereon by an electrostatic device 219 interconnected thereto by lead means 220 in substantially the same manner as the electrostatic creating means previously described.

Thus, it can be seen that by creating a potential differential between the liquid in the paper sheet slurry 206 passing over the electrode means 218 and the suction box means 210, such potential differential tends to draw such liquid from the sheet slurry 206 through the foraminous belt means 201 and into the suction box means 210 toward the electrode means 218 whereby such electrostatic principle assists the suction means 213 in removing the moisture from the paper slurry means 206 in a believed to be faster manner than when the electrode means 218 are not utilized.

It is believed that such potential differential liquid removing operation of the electrode means 218 can be further improved by having an opposite potential imposed on the liquid in the moisture bearing material 206 while the same is being supported on the side 204 of the moving foraminous belt means 201.

For example, the other potential being created by the electrostatic means 219 can be imposed directly in the paper slurry 202 in the supply means 203 by a lead means 221 so that when the paper slurry 206 is deposited on the side 204 of the foraminous belt means 201, the liquid therein has one potential so that when the same moves over the suction box means 210, the opposite potential on the electrode means 218 will more fully attract the liquid in the paper slurry 201 to tend to draw the same through the foraminous belt means 201 into the suction box means 210.

Alternately, or in combination, rotatable electrode means 222 can be interconnected to the lead 221 of the electrostatic device 219 by a lead 223 so that a potential opposite to the potential being imposed on the electrode means 218 by the electrostatic device 219 can be imposed directly on the belt means 201, if the belt means 201 is formed of conductive material, such as being metallic foraminous belt means or the like. In this manner the foraminous belt means 201 will have a potential imposed thereon which is opposite to the potential imposed on the electrode means 218.

If the electrode 222 is utilized in combination with the foraminous belt means 201 and the electrostatic device 219 does not impose a potential in the liquid of the slurry 202 in the supply means 203, it can be seen that the liquid in the slurry 202 in the supply means 203 will be substantially at ground potential and after the same is deposited on the side 204 of the moving belt means 201, the potential imposed on the belt means 201 by the electrode means 222 will tend to cause the liquid in the paper slurry sheet means 206 to be drawn toward the belt means 201 and have the potential of the belt means 201 imposed thereon at a point adjacent the belt means 201 where it contacts the drawn liquid whereby the opposite potential on the electrode means 218 will thereafter attract the liquid adjacent the belt means 201 through the belt means 201 into the suction box means 210.

Accordingly, it can be seen that the paper making apparatus and method 200 of FIG. 7 provides improved means for drying or removing the liquid in paper slurry being formed into sheet form either as a continuous sheet or individual sheets, as desired.

Further, while the embodiment of FIG. 7 has been specifically described as a paper making apparatus, it is to be understood that such apparatus could be other apparatus that forms members from liquid bearing material that is to be subsequently dried by having the liquid removed therefrom.

While the paper making apparatus and method 200 previously described for the embodiment of FIG. 7 utilizes the electrode means 218 in combination with suction box means 210 in removing the liquid from the paper slurry 206 through the foraminous belt means 201 to the other side 209 thereof, it is to be understood that it may be found that the electrode means 218 can be utilized without such suction means and effectively remove the moisture from the paper slurry 206 in such a manner that no air flow is provided through the paper slurry during the drying operation so that an improved paper is made, such as by not having a need for a subsequent rolling of the same and/or by providing an improved surface or sides thereof that cannot be provided when a suction means is utilized thereon.

For example, reference is now made to FIG. 8 wherein another paper making apparatus of this invention is generally indicated by the reference numeral 300 and parts thereof similar to the apparatus 200 previously described are indicated by like reference numerals raised in value by 100.

As illustrated in FIG. 8, the apparatus 300 is identical to the apparatus 200 previously described except that the apparatus 300 does not utilize the suction box means 210 and suction means 213 to assist in the removing of the liquid from the slurry 303 being moved by the foraminous belt means 310 from left to right as the liquid in the slurry sheet 306 is being drawn therefrom solely by the potential differential created therebetween by the electrostatic device 319 imposing one potential on the electrode means 318 and imposing an opposite potential either on the liquid in the slurry 302 in the supply means 303 and/or on the foraminous belt means 301 by the electrode means 322 or without imposing any opposite potential on the liquid in the slurry by not having its lead 321 operatively connected to the paper slurry 306.

However, it may be found that it is also desirable to provide a squeezing action on the paper sheet means 306 as it passes from left to right over the electrode means 318 to either improve the surface quality of the resulting sheet means 306 and/or assist in removing the moisture therefrom so that the resulting sheet means 306 will have the desired thickness and also the desired upper finish on the upper side thereof.

If so, a continuous metallic belt means 324 can be passed around roller means 325 so as to be disposed over the sheet means 306 and be engageable therewith while the lower run of the belt means 324 is moving from left to right in unison with the upper run of the belt members 201. By so controlling the position of the electrode means 318 relative to the moving belt means 301 and in connection with the moving belt means 324, an attractive force by the potential differential between the belt means 324 and electrode means 318 will be created to tend to pull the belt means 324 downwardly, as indicated by the arrows 326 in FIG. 8 to compact the sheet means 306 between the lower run of the belt means 324 and the foraminous belt means 301 so as to provide an improved finishing on the upper side of the sheet means 306 and/or to provide a squeezing action on the sheet means 306 to assist in the liquid removing operation thereof, or both, as well as to insure a predetermined thickness of the resulting sheet means 306 being wound on the coil means 307.

In order to improve the action of the belt means on the sheet means 306 for one or more of the purposes previously described, the electrostatic device 319 or another electrostatic device 327 can impose a potential on the belt means 324 opposite to the potential being imposed on the electrode means 318, the electrostatic device 327 having a rotatable electrode 328 disposed in engagement with the belt 324 and being interconnected to the electrostatic device 327 by a lead means 329.

Further, it may be found that by having an opposite potential imposed on the belt means 324 from the potential being imposed on the electrode 318, such potential will be imposed on the liquid in the slurry sheet 306 coming into contact therewith so that the upper liquid area of the slurry sheet 306 will have an opposite potential to the potential of the electrode means 318 and therefore be more readily drawn toward the electrode means 318 than would be the case if such upper liquid did not have the opposite potential imposed thereon. In this manner, a thicker sheet means 306 could be made by the apparatus 300 and the electrode means 318 could remove the liquid therefrom solely by the potential differential previously described.

Of course, the belt means 324 could also be utilized in combination with the apparatus 200 previously described and if such belt means were utilized therewith and it is not desired that the belt means 324 be drawn into squeezing action with the sheet 206 by the suction means being created by the suction boxes 210, such belt means 324 could be formed of foraminous material so that the same would not impede the flow of air through the sheet means 206 into the suction box means 210.

In forming other types of paper or articles, it may be found that it is desirable not to utilize the belt means 324 of the apparatus 300 and to provide a means for fluffing the paper sheet slurry as the same is being dried by the electrostatic principle of this invention.

Accordingly, another embodiment of this invention is generally indicated by the reference numeral 400 in FIG. 9 and parts thereof similar to the apparatus 200 previously described are indicated by like reference numerals raised in value by 200.

As illustrated in FIG. 9, the paper making apparatus 400 is substantially identical to the apparatus 300 of FIG. 8 wherein the electrode means 418 are being utilized without the suction box means 210 in removing the moisture from the sheet means 406 as the same moves over the electrode means 418 on the moving belt means 401.

However, another foraminous belt means 430 is passed around a pair of roller means 431 and has its lower run moving from left to right in unison with the belt means 401 so that the paper sheet means 406 will be carried therebetween. A plurality of suction box means 410, formed in a manner similar to the suction box means 210 previously described, are disposed against the upper side of the lower run of the belt means 430 to impose a suction on the other side of the sheet means 406 as the same passes beneath the suction box means 410 whereby the suction device 413, through the conduit means 414, will not only tend to draw the moisture or liquid in the sheet means 406 upwardly into the chambers 411 and, thus, into the inlet side 412 of the suction device 413, but will also tend to maintain or fluff the sheet means 406 to a predetermined thickness while the electrode means 418 is removing the liquid from the sheet means 406 in a downward direction through the moving belt means 401 in the manner previously described.

Thus, by using the suction box means 410 in combination with the electrode means 418, the liquid in the sheet means 406 at the top thereof will be readily removed by the suction box means 410 whereas the other liquid in sheet means 406 will be drawn downwardly by the aforementioned potential differential arrangement and the sheet means 406 will have a tendency to be fluffed or maintained in a predetermined thickness during the drying operation whereby a more fluffy tissue or the like can be provided by the apparatus 400 of this invention.

Of course, it is to be understood that the apparatus 400 can be utilized for making other than fluffy tissue as the principle being disclosed by the embodiment of FIG. 9 could apply to other types of paper or articles as desired.

In addition, the suction box means 410 of the apparatus 400 could include electrode means therein similar to the electrode means 218 previously described and have imposed thereon a potential opposite to the potential being imposed on electrode means 418 to further assist the suction box means 410 in drawing the upper part of the liquid in the sheet means 405 upwardly therefrom through the foraminous belt means 430 into the suction box means 410, if desired. In addition, the foraminous belt means 430 could have such opposite potential imposed thereon in a manner similar to the electrode means 422 for imposing a potential on the moving belt means 401.

Therefore, it can be seen that this continuation-in-part application provides an improved paper making apparatus as well as an improved paper making method.

While the various embodiments of this invention have been previously described in connection with laundry apparatus, paper making apparatus, etc., wherein the attracting electrode is adapted to have the moisture being attracted thereby actually reach such electrode, it may be found that it is desirable to prevent the moisture from reaching the electrode to, in effect, short or ground the same or otherwise change the effective potential condition thereof.

Further, it may be found that it is desirable to surround such electrode means with an atmosphere condition or pressure different from the atmosphere condition or pressure normally disposed about the moisture bearing material being acted on by such electrode means.

Accordingly, reference is now made to FIG. 10 wherein another laundry apparatus of this invention is generally indicated by the reference numeral 500 and will now be described.

As illustrated in FIG. 10, the laundry apparatus 500 includes an outer surrounding stationary drum or tub 501 mounted in a suitable casing, such as casing 11 of FIG. 1, and suitably supporting a rotatable foraminous carriage or drum 502 therein for receiving and supporting wet laundry 503 on the inner surface 504 thereof.

A nozzle means 505 is carried by the stationary drum 501 and has an opening 506 directed toward the outer surface 507 of the rotatable foraminous drum 502 in substantially a sealing relationship therewith but may be slightly spaced therefrom so as to minimize any frictional interference between the nozzle means 505 and drum 502 as will be apparent hereinafter.

A metallic electrode plate or disc 508 is completely encased within an electrical insulating material 509 which cooperates with the electrode 508 to completely electrically insulate the same from the interior chamber 505' of the nozzle means 505, the insulated electrode means being generally indicated by the reference numeral 510.

For example, the insulating means 509 can provide a shaft portion 511 rotatably supported in suitable bearing means 512 of the nozzle means 505 so that the plate electrode 508 and surrounding insulating material 509 can be rotated in the chamber 505' in any suitable manner.

For example, the insulating plate means 509 can have a plurality of vanes 513 formed about the outer periphery thereof that cooperates with the interior wall of the nozzle means 505 in such a manner that as air movement is caused through the chamber 505' of the nozzle means 505 in a manner hereinafter described, such air movement passing over the fins or vanes 513 will cause the electrode means 510 to rotate in the chamber 505' for a purpose hereinafter described.

An electric potential creating device 514 is provided for the apparatus 500 and is adapted to have one side thereof electrically interconnected to the electrode 508 by a lead 516 that terminates at a stationary slip ring arrangement 517 that maintains electrical contact with an internal lead 508 in the shaft portion 511 that leads to the electrode plate 508 whereby electrical contact is maintained between the lead 516 and the electrode plate 508 even though the shaft 511 is rotating relative to the stationary means 517.

The nozzle means 505 has an opening 519 at the lower end thereof disposed in fluid communication with a conduit means 520 that leads to the inlet side 521 of an air pumping means 522. The outlet side 523 of the pumping device 522 is interconnected by a conduit 524 to a chamber defining means 525 having an electrical heater means 526 mounted therein. The heating chamber 525 is, in turn, interconnected by a conduit 527 to another chamber defining means 528 that has another rotatable insulated electrode means 529 disposed therein and formed in substantially the same manner as the insulated electrode means 510 previously described.

An internal metallic electrode plate 530 of the insulated electrode means 529 is adapted to be electrically interconnected to the other side 531 of the electric potential creating device 514 by a lead 532 in a manner similar to the lead 516 for the insulated electrode means 510 previously described.

In this manner, the insulated electrode means 529 will perform a condensor function for stripping moisture from air passing through the chamber defining means 528 in a manner hereinafter described.

The chamber defining means 528 is interconnected by a conduit means 533 to another chamber defining means 534 having an electrical heater means 535 disposed therein. The chamber defining means 534 is, in turn, interconnected by a conduit means 536 to the interior of the stationary drum 501, the conduit means 536 having a pressure regulating valve 537 therein for a purpose hereinafter described.

The operation of the laundry apparatus 500 will now be described.

When it is desired to dry the wet laundry 503 in the laundry apparatus 500, or if the laundry apparatus 500 is a combination washing-drying machine in the manner previously described, the body of liquid therein is drained from the stationary tub 501 through the conventional draining means 538 thereof and then the drum or foraminous carriage 502 is rotated in a counterclockwise direction in FIG. 10. At this time, the air pumping means 522 is energized and the electrostatic creating means 514 is also operated so as to impose one potential on the electrode plate 508 of the rotatable and insulated electrode means 510 while an equal and opposite potential is imposed on the plate 530 of the rotatable and insulated electrode means 529.

As the pumping device 522 tends to draw air in through the opening 506 of the nozzle means 505 into the inlet side 521 of the pumping means 522, such movement of air within the chamber 505' of the nozzle means 505 causes the insulated electrode means 510 to rotate relative to the nozzle means 505. Similarly, the air being expelled by the pumping device 522 at its outlet side 523 passes through the chamber defining devices 525, 528 and 534 back into the stationary drum 501 such movement of the air through the chamber defining means 525 causing the insulated electrode means 529 to rotate relative to the chamber defining means 528.

As previously stated, the potential differential being created between the moisture in the moisture bearing material 503 and the electrode plate 508, tends to cause such moisture to leave the moisture bearing material 503 and pass through the foraminous drum 502 into the opening 506 of the nozzle means 505 and go toward the electrode plate 508. However, because the moisture that collects on the insulated covering 509 of the electrode plate 508 connot reach the plate 508, the effective potential condition of the plate 508 is not changed by the moisture entering the opening 506 of the nozzle means 505. Because the insulated electrode means 510 is being rotated in the nozzle 505, any moisture collecting on the rotating electrode means 510 will be driven off the same by the centrifugal action being created by the rotating nozzle means 510 whereby such moisture will be drawn through the opening 519 and into the pump means 522 to be expelled therefrom through conventional moisture removing means.

However, since some of the moisture passing into the pump 522 will be trapped in the air in the form of vapor, such moisture laden air will be passed out the outlet side 523 of the pumping device 522 into the chamber 525 to be heated by the heating means 526. Subsequently, such heated air will pass into the chamber 528 whereby it is believed that the potential being created on the electrode plate 530 will tend to strip the moisture from the air passing through the chamber defining means 528. In this manner, the rotating electrode means 529 acts as a condenser apparatus for stripping the moisture from the air passing form the pump means 522 before the same is directed back into the stationary drum 501. Also, after the moisture stripped air passes from chamber 528, the same is heated by the heater means 535 in chamber 534.

Of course, it may be found that it is desirable only to heat the air before the same reaches the electro static moisture stripping chamber 528 or it may be found that it is only desirable to heat the air after the same has had the moisture stripped in the chamber 528.

Thus, it can be seen that the electrode means 510 is being utilized to remove moisture from the moisture bearing material 503 and the electrode means 529 is being utilized to remove moisture from the air before the same is directed back into the laundry apparatus 500, the air pressure regulating means 537 being utilized to maintain a constant rate of air being directed back into the drum 501.

Also, it can be seen that the pumping means 522 is creating an atmospheric condition about the electrode means 510 that is different than the atmospheric condition about the moisture bearing material 503, the pumping means 522 creating a substantially subatmospheric pressure about the electrode means 510 in a localized manner which tends to assist the withdrawing of moisture form the moisture bearing material 503 through the foraminous drum 502 into the nozzle means 505.

Of course, if the nozzle means 505 is slightly spaced from the rotating foraminous drum 502, the rush o air about the nozzle means 505 into the opening 506 thereof will tend to sweep the moisture clinging in the openings of the foraminous drum 502 at the under side thereof into the nozzle means 505 so as to tend to reduce the tendency for the clinging moisture to be reabsorbed into the moisture bearing material 503 after the particular section thereof has passed beyond the nozzle means 505.

While the laundry machine 500 has been described as utilizing a moisture stripping electrode means 529 in combination with the moisture removing electrode means 510, it is to be understood that the nozzle means 505 with its insulated electrode means 510 can be utilized independently of any condensing action or the like, if desired, whereby the outlet of the pump means 522 can be merely directed exteriorly of the apparatus 500. Conversely, the moisture stripping elecrode means 529 could be utilized independently of the electrode means 510 in conventional apparatus for its moisture removing a condensing action, if desired.

Further, while the electrode means 510 and 529 have been described as being rotated by air movement in order to remove any clinging moisture therefrom, such electrode means 510 and 529 could be rotated mechanically in any desired manner.

While the apparatus 500 has been previously described as having a localized subatmospheric condition about the electrode means 510 during its moisture removing operation, it is to be understood that it is believed that the principles and functions of this invention can be accomplished even if the insulated electrode means 510 is surrounded by a superatmospheric pressure.

Accordingly, reference is now made to FIG. 11 wherein another laundry apparatus of this invention is generally indicated by the reference numeral 500A and parts thereof similar to the apparatus 500 previously described are indicated by like reference numerals whereby the reference letter "A."

The apparatus 500A has the nozzle means 505A carried by the stationary tub 501A except that the interior chamber 505'A of the nozzle means 505A is interconnected to the outlet side 539 of the air pumping means 522A and the opening 519A at the bottom thereof is interconnected by a conduit means 540 to the drain conduit 538A, the conduit means 540 having a restrictor 540' therein for a purpose hereinafter described.

The rotatably mounted and insulated electrode means 510A in the nozzle means 505A functions in the same manner as the insulated electrode means 510 previously described. However, during the moisture removing operation of the apparatus 500A, the pumping means 522A creates an air pressure in the chamber 505'A of the nozzle means 505A greater than the air pressure surrounding the moisture bearing material 503 or just slightly greater than the same so as to prevent a high humidity condition within the nozzle means 505A. However, this increased air pressure in the nozzle means 505A is believed not to impede the potential differential moisture attraction feature caused by the electrode means 510A on the moitsure in the moisture bearing material 503A so that the moisture is still drawn from the moisture bearing material 503A into the nozzle means 505A and as the same reaches the bottom 519A thereof, the air pressure in the nozzle means 505A forces the same out through the conduit means 540 into the drain conduit 538A.

If desired, a pressure regulator can be disposed in the conduit means 520A leading from the pump 522A to the nozzle means 505A so as to maintain a constant pressure in the nozzle means 505A regardless of the amount of clothes covering the nozle means 505A at any one time.

Therefore, it can be seen that it is believed that the electrostatic moisture removing principle of this invention can be accomplished under atmospheric conditions as previously described in connection with the plate means 111B of FIG. 6, under localized subatmospheric conditions, such as illustrated in FIG. 10, or in localized superatmospheric conditions as illustrated in FIG. 11.

Further, since the electrode means 510 and 510A previously described for the embodiments of FIGS. 10 and 11 are covered by insulating material, the moisture that is attracted toward the electrode means 510 and 510A is prevented from reaching the metallic electrodes thereof and thereby cannot change the effective potential condition thereof so that a continuous moisture attracting feature is provided without requiring an alternating grounding and recharging of the electrode as in earlier described embodiments.

Further, by having the electrode means 510 and 510A rotating in such a manner, the moisture collecting thereon can be removed therefrom.

However, it is to be understood that such collecting moisture can be removed from the insulated electrode means by other means, if desired.

Another laundry machine of this invention is generally indicated by the reference numeral 600 in FIGS. 12 and 13 and comprises an outer stationary drum or tub 601 rotatably supporting a foraminous carriage or drum 602 that is adapted to receive moisture bearing material or laundry 603 in the manner previously described.

However, a nozzle means 604 is received in an opening 605 through the stationary drum 601 and is movable relative thereto, the nozzle means 604 having suitable diaphragm sealing means 606 interconnected thereto and to the inside of the stationary drum 601 to prevent any liquid from escaping from the drum 601 into the opening 605.

The nozzle means 604 rotatably carries a cylindrical electrode means 607 of this invention, the electrode means 607 comprising an electrically insulating material 608 having a cylindrical metallic electrode 609 completely embedded therein in the manner illustrated in FIG. 12 so that the insulating material 608 will completely prevent any moisture from actually contacting the metallic electrode 609.

As illustrated in FIG. 13, the insulated electrode 607 has insulating shaft portions 610 extending from opposed sides thereof and respectively received in suitable bearing openings 611 of the nozzle means 604 whereby a suitable stationary electrical connector 612 can be electrically connected to the metallic electrode 609 in the manner previously described even though the electrode means 607 rotates relative to the connector 612. The connector 612 is interconnected by a lead 613 to an electrical potential creating device 614 in the manner previously described whereby the potential creating device 614 can create an electrical potential on the electrode means 609 for the moisture removing purposes previously described.

The nozzle means 604 has an opening 615 at the upper end thereof and out through which the cylindrical electrode means 607 extends in the manner illustrated in FIGS. 12 and 13 whereby a suitable compression spring 616 can be utilized to continuously urge the cylindrical electrode 607 into engaging contact with the foraminous drum 602.

A conduit means 617 leads to the interior 618 of the nozzle means 604 and has a restriction means 619 therein.

A suitable flexible doctor blade 620, or the like, is carried by the nozzle means 604 so as to be in engaging contact with the exterior surface of the cylindrical electrode means 607.

The operation of the laundry apparatus 600 of FIGS. 12 and 13 will now be described.

During the moisture removal operation, the electrical potential creating device 614 is creating a potential on the metallic electrode 609 of the electrode means 607 and since the electrode means 607 is in contact with the foraminous drum 602, rotation of the foraminous drum 602 in a counterclockwise direction in FIG. 12 causes the drum electrode 607 to rotate in a clockwise direction in unison therewith whereby the electrode 609, through the potential differential between the electrode 609 and the moisture bearing material 603 causes the moisture in the material 603 to pass through the foraminous drum 602 and onto the outer peripheral surface of the electrode 609 to be subsequently wiped away by the doctor blade 620 and collect at the bottom of the nozzle means 604. Because the air pump 621 is interconnected to the interior 618 of the nozzle means 604 by a conduit means 622 and is creating an air pressure in the nozzle means 604 greater than the air pressure surrounding the moisture bearing material 603 in a manner similar to the nozzle means 505A previously described, such air pressure in the nozzle means 604 will force the moisture collecting therein out through the conduit means 617.

Therefore, it can be seen that the cylindrical electrode means 607 is adapted to continuously remove moisture from the moisture bearing material 603 by the aforementioned electrostatic principles.

However, it may be found that it is not desirable to have the exterior peripheral surface of the cylindrical electrode means 607 actually engage the foraminous drum 602 and that the same should be slightly spaced therefrom.

Accordingly, another apparatus of this invention is generally indicated by the reference numeral 600A in FIGS. 12A and 13A and parts thereof similar to the apparatus 600 are indicated by like reference numerals followed by the reference letter "A."

As illustrated in FIGS. 12A and 13A, the apparatus 600A is identical to the apparatus 600 previously described except that a pair of large cylindrical discs 623 are carried by the shaft portion 610A of the cylindrical electrode means 607A with those discs 623 bearing against the foraminous drum 602A so as to hold the cylindrical electrode means 607A slightly spaced from the foraminous drum 602A even though causing rotation thereof 607A as the drum 602A is rotated.

Thus, the cylindrical electrode means 607A is disposed spaced from the foraminous drum 602A in the same manner that the rotatable electrodes 510 and 510A of FIGS. 10 and 11 are spaced from the foraminous drum 507 and 507A.

The previously described features of utilizing an insulated electrode for moisture removal purposes and/or having such electrode disposed in a localized atmospheric condition different from the atmospheric condition surrounding the moisture bearing material can also be applied to the paper making apparatus previously described.

Accordingly, reference is now made to FIG. 14 wherein another paper making apparatus of this invention is generally indicated by the reference numeral 700 and will now be described.

The paper making apparatus 700 includes a continuously moving foraminous belt means 701 adapted to pass around the roller means 702 in the manner similar to the foraminous belt means 201 previously described for the embodiment of the paper making apparatus of FIG. 7. The belt means 701 is adapted to have a paper slurry 703 disposed thereon in any of the manners previously described to the left in FIG. 14 so that the slurry 703 is moved from left to the right in FIG. 14 as the belt means 701 is moved from left to right in FIG. 14.

The paper making apparatus 700 includes a nozzle means 704 formed in a manner similar to the nozzle means 505A previously described and contains a rotatable and insulated electrode means 705 having the metallic electrode plate 706 thereof completely insulated by the electrically insulating material 707 that has vanes 708 at the outer periphery thereof and a stem portion 709 rotatably mounted in suitable bearing means 710. A conductor 711 in the stem 709 is electrically interconnected to the metal plate 706 and to the stationary contact means 712 which is interconnected by a lead 713 to the electrical potential creating device 714 in the manner previously described. An air pump 715 is interconnected by a conduit means 716 to the interior chamber 717 of the nozzle means 704, the conduit means 716 having a suitable pressure regulator means 718 therein.

The nozzle 704 has an opening 719 at the upper side thereof and an opening 720 at the lower end thereof which can be a restricting opening 720 so as to maintain an air pressure in the chamber 717 greater than the atmospheric pressure surrounding the paper slurry 703 for the reasons previously set forth.

Of course, the nozzle means 704 can be constructed in a manner similar to the nozzle means 505 of FIG. 10 so as to create a subatmospheric pressure about the rotatable electrode means 705, if desired.

In any event, it can readily be seen in FIG. 14 that as the paper slurry 703 is moved from left to right by the moving foraminous belt 701, the slurry 703 passes over the opening 719 in the nozzle means 704 and has the moisture therein attracted by the potential differential between the electrode plate 706 and the moisture in the slurry 703 so as to enter the nozzle means 704 and be attracted toward the electrode plate 706. However, since the moisture cannot reach the electrode plate 706, the potential condition of the electrode means 705 remains unchanged and the moisture collecting on the electrode means 705 can be removed therefrom by the centrifugal force of the rotating electrode 705 so as to pass out through the opening 720.

Another nozzle means 704A is provided for the paper making apparatus 700 and parts thereof similar to the nozzle means 704 are indicated by like reference numerals followed by the reference letter "A."

As illustrated in FIG. 14, the air pump 715A is interconnected by the conduit 716A to the opening 720A at the bottom of the nozzle means 704A and is adapted to tend to evacuate the chamber 717A so as to maintain the same at a reduced atmospheric pressure relative to the atmospheric pressure surrounding the paper slurry 703 passing over the same.

The outlet side of the pumping means 715A for the air flow is interconnected to a conduit means 721 that leads to a chamber defining means 722 having a rotatable and insulated electrode means 723 disposed therein in the same manner as the electrode means 529 of FIG. 10 for stripping moisture from the air passing through the chamber defining means 722 that leads to a conduit means 724. The electrostatic creating device 714A is adapted to impose one potential on the metal plate 725 of the electrode means 723 by a lead 726 and an equal and opposite potential on the electrode plate 706A of the rotatable electrode means 705A of the nozzle means 704A by the lead 713A.

The conduit 724 has a pressure regulator 727 disposed therein and leads to a chamber defining device 728 that carries a spray nozzle 729 for disposing or spraying a coating means 730 onto the top surface of the paper slurry 703 as the same passes over the nozzle means 704A. In particular, the chamber defining means 728 has an opening 731 at the lower end thereof and through which the spray nozzle means 729 is adapted to spray the coating 730 onto the top of the paper 703.

If desired, an electrical potential can be created on the coating material 730 as the same is sprayed from the nozzle 729 in a conventional manner by an electrostatic creating device 732 being electrically interconnected to the nozzle means 729 by a lead 733.

The operation of the paper making apparatus 700 will now be described.

As the paper slurry 703 is moved from left to right in FIG. 14 past the nozzle means 704, the same removes moisture from the paper slurrys 703 by the potential differential created between the electrode plate 706 and the moisture in the paper slurry 703 in the manner previously described.

However, as the paper slurry 703 passes under the chamber defining means 728, the nozzle means 729 sprays the coating 730 onto the top of the paper slurry 703 with such coating 730 being attracted toward the nozzle means 704A by the aforementioned potential differential being created between the electrode plate 706A and the liquefied coating 730. In this manner, the coating 730 is not only confined to the paper slurry 703 but is fully impregnated thereto by the attracting force of the nozzle means 704A.

In particular, since the air pump 715A is tending to maintain the chamber 717A at a subatmospheric pressure below the atmospheric pressure surrounding the slurry 703 as the same passes over the nozzle means 704A, the air is expelled through the pump 715A into the chamber defining means 722 to have any moisture thereof stripped by the rotating electrode means 723 in the manner similar to the electrode means 529 previously described.

The dried air is now forced through the pressure regulator 727 into the chamber defining means 728 to surround the nozzle means 729 with a dried atmospheric pressure greater than the atmospheric pressure outside of the confining means 728 so that no adverse high humidity condition will prevent the coating material 730 in the nozzle means 729 from receiving a charge from the charging device 732 so that the same will be fully directed toward the paper slurry 703 and when the same engages the paper means 703, such coating is attracted toward the electrode 705A which can have a potential thereon opposite to the potential initially being imposed on the coating 730 by the electrostatic device 732.

Accordingly, it can be seen that not only does the nozzle means 704A provide a function of removing moisture from the paper slurry 703 if the same still has a moisture content therein, but also the nozzle means 704A assures that the coating 730 is directed toward the paper 703 and will tend to hold and impregnate the same in the paper slurry 703 because of the aforementioned potential differential between the coating 730 and the electrode plate 706A of the nozzle means 704A.

Another electrode means for use with the paper making apparatus either for moisture removing purposes or for impregnating a coating therein is generally indicated by the reference numeral 800 in FIGS. 16 and 17 and comprises and insulated and rotatable cylindrical electrode means 801 and nozzle means 802 functioning in the same manner as the electrode means 607 and nozzle means 604 of the laundry apparatus 600 of FIGS. 12 and 13.

Alternately, instead of the electrode means 801 engaging against the foraminous belt 803 as illustrated in FIGS. 16 and 17, the electrode means can be slightly spaced therefrom by disc means 804 as illustrated in FIG. 16A functioning in the same manner as the disc means 623 illustrated in FIG. 13A so as to hold the cylindrical electrode means 805 in spaced relation from the foraminous belt 806.

Accordingly, it can be seen that while the electrostatic features of FIGS. 1–9 are to tend to direct moisture from moisture bearing material toward an electrode means by a potential differential being created therebetween, the embodiments of FIGS. 10–17 provide electrode means that prevent the moisture from actually engaging the effective part of the electrode means to change the potential condition thereof and also such embodiments provide means for creating localized atmospheres about the electrode means different from the atmospheres about the moisture bearing bearing material.

In this manner, it is believed that any humidity conditions which normally surround the moisture bearing material will not cause a shorting or dissipation of the electrode potential differential feature of this invention.

Of course, instead of creating a different atmospheric condition about the electrode means by the nozzle means of this invention, such electrode means can be surrounded by a dry gaseous media, such as an inert gas which would prevent any moisture saturation thereof.

While the various embodiments of this invention previously described provide a nonuniform electric field between the smaller collecting electrode means and the other larger electrode means having an opposite potential whereby the higher intensity portion of the static electric field is adjacent the collecting electrode to cause the moisture to move toward the same, such static or alternating electric field means is more fully disclosed in FIGS. 18–27 hereinafter to be described.

For example, it is obvious from the embodiment of FIG. 5 of this invention that the very small electrode means 112 in relation to the size of the charged supporting means 17A of FIG. 3 will create a nonuniform static electric field wherein the field lines converge on the collecting electrode means 112 so that the moisture in the laundry on the support means 17A will be drawn toward the higher intensity portion of the electric field adjacent the electrode 112.

Figure 18:
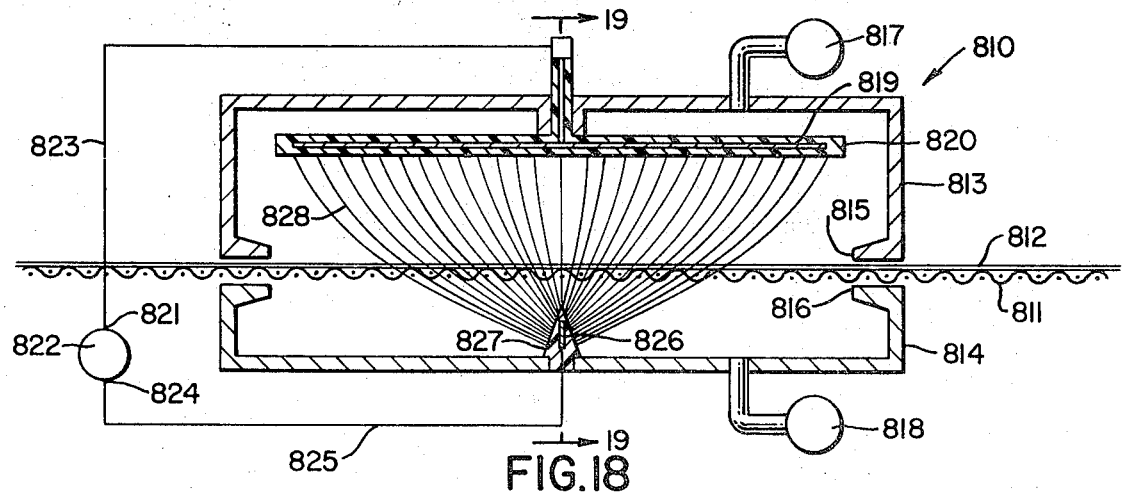
FIG. 18 is a view similar to FIG. 14 and illustrates another embodiment of this invention.

Therefore, reference is now made to FIG. 18 wherein another embodiment of this invention is generally indicated by the reference numeral 810 and comprises a paper-making apparatus or the like having a continuous foraminous support means 811 moving from left to right in FIG. 18 and carrying moisture-bearing paper means 812 on the upper side thereof that is to have the moisture thereof removed, the support means 811 and paper means 812 moving in unison between two nozzle means 815 and 814 of this invention respectively having open ends 815 and 816 facing toward each other and each being slightly pressurized by dry air being pumped therein by pump means 817 and 818 so as to tend to purge the nozzle means 813 and 814 from humid atmospheric conditions. The nozzle means 813 carries a large plate electrode means 819 covered with suitable insulating material 820 and being interconnected to one side of an electrical potential creating device 822 by lead means 823, the other side 824 of the electrical potential creating device 822 being interconnected by a lead means 825 to a small electrode means 825 covered by suitable insulating material 827 and being carried by the lower nozzle means 814.

By varying the size of the electrode means 819 and 826 relative to each other as well as directing a pointed or knife edge of the electrode means 826 toward the large plate electrode means 819 as well as by controlling the configuration of the insulating means 820 and 826 and the distance between the electrode means 819 and 826, a strong non-uniform electric field can be created between the electrode means 826 and 819 wherein the lines of force defining the nonuniform field have the higher intensity thereof adjacent the electrode means 826 as illustrated schematically by the field force lines 828 in FIG. 18.

In this manner, as the moisture-bearing paper material 812 passes between the nozzle means 813 and 814, the moisture therein is attracted by the nonuniform field in such a manner that the moisture tends to move through the foraminous belt means 811 toward the higher intensity portion of electric field 828 and, thus, toward the electrode means 826 for the reasons previously set forth.

While the electrostatic or electrical potential creating device 822 has been described as providing one potential on the electrode means 819 and another potential on the electrode means 826, it is to be understood that the device 822 can create opposite potentials on the electrode means 819 and 826 in an alternating manner whereby alternating current can be utilized rather than direct current as previously described.

Figure 19:
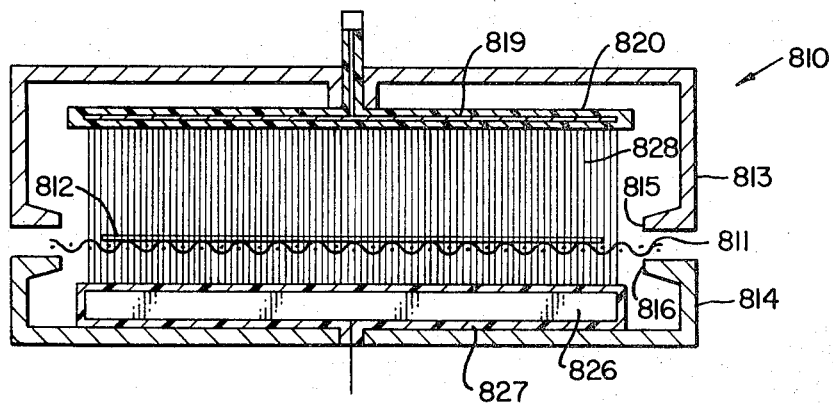
FIG. 19 is a cross-sectional view taken substantially on line 19—19 of FIG. 18.
Figure 20:
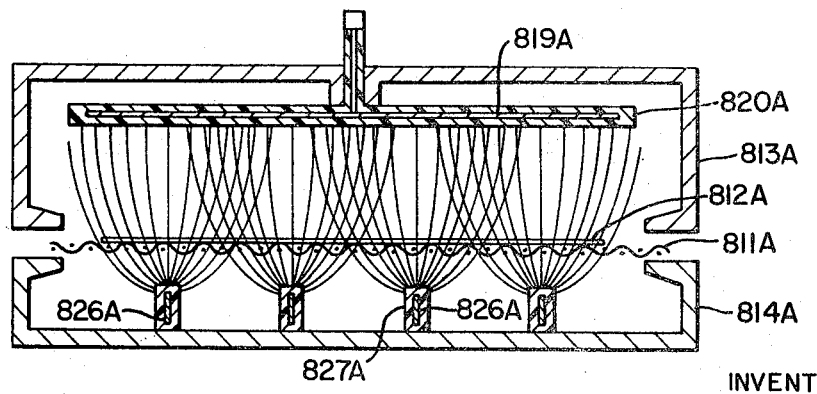
FIG. 20 is a view similar to FIG. 19 and illustrates another embodiment of this invention.

Also, while the electrode means 826 is illustrated in FIG. 19 as being knife-like with the longitudinal axis thereof extending transverse to the direction of movement of the support means 811, it is to be understood that the electrode means 826 could comprise a plurality of individual wires or points 826A as illustrated in FIG. 20 and could be arranged in any suitable pattern relative to the upper electrode means 819A so as to be generally disposed completely under the area bounded by the upper electrode means 819A if desired. Also, the knife-like electrode means 826 of FIGS. 18 and 19 can be disposed with the longitudinal axis thereof extending in the direction of movement of the support means 811 and a plurality of the same can be utilized in a transverse or longitudinal pattern or other as desired, the purpose being to create one or more nonuniform fields between the upper and lower electrode means with the higher intensity portion of the electrostatic or alternating electric field therebetween being adjacent the lower electrode means so as to cause the moisture in the moisture-bearing material to pass through the support means and move toward the higher intensity portion of the electric field adjacent the lower electrode means. Of course, the closer the support means 811 and paper 812 are to the lower electrode means 826, the greater is the force of the nonuniform field thereon for moisture removal purposes.

Figure 21:
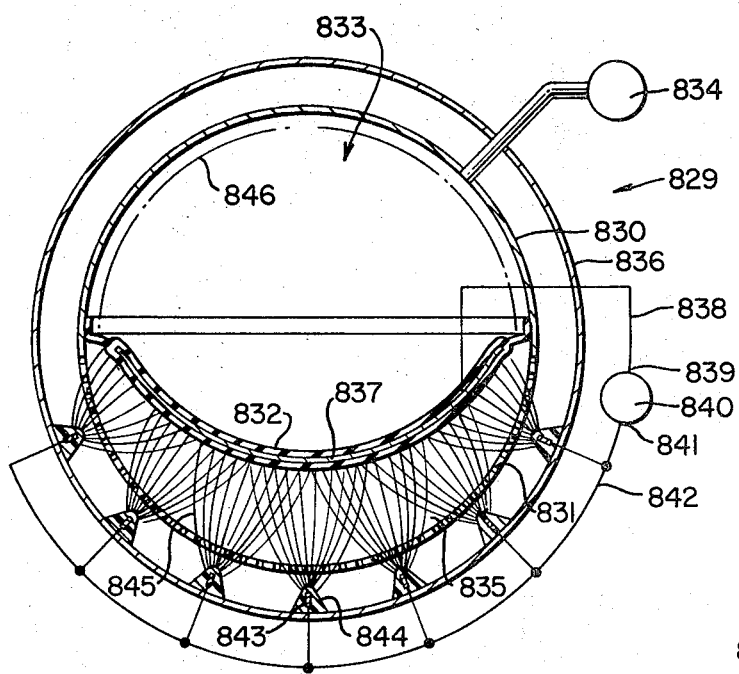
FIG. 21 is a view similar to FIG. 10 and illustrates another laundry machine of this invention.

Another laundry apparatus of this invention is generally indicated by the reference numeral 829 in FIG. 21 and comprises a substantially spherical inner laundry supporting structure 830 having one-half thereof perforated as indicated by the perforations 831 while the other half thereof is air tight and cooperates with a flexible membrane 832 to define a chamber 833 therebetween which when pressurized by an air pump 834 or the like will cause the membrane 832 to expand outwardly toward the perforations 831 and trap the moisture-bearing laundry 835 therebetween to impose on the laundry 835 a squeezing action so as to tend to force the moisture therein up through the perforations 831 and into an outer surrounding casing means 836 which can have a suitable drain means at the lower portion thereof. The membrane 832 can be formed of nonconducting material and has a large flexible conductive electrode means 837 embedded therein and being interconnected by a lead means 838 to one side 839 of an electrostatic or electrical potential creating device 840. The other side 841 of the electro-potential creating device 840 is interconnected by lead means 842 to a plurality of smaller pointed or knife-like electrode means 843 that are covered with suitable insulating material 844 and are arranged in the bottom half of the casing means 836 so as to cooperate with the large electrode means 837 in creating a plurality of nonuniform fields 845 therebetween whereby the laundry 835 will be disposed in such nonuniform fields, and the moisture in the moisture-bearing laundry 835 will be drawn from the laundry 835 through the perforations 831 and toward the electrode means 843 because the higher intensity portions of the electric fields 845 are adjacent the electrode means 843.

While the particular details of a laundry apparatus similar to the apparatus 829 of FIG. 21 are disclosed and claimed in applicant's copending patent application, Ser. No. 701,602, filed Jan. 30, 1968, the particular details thereof need not be described except as follows to illustrate the operation of the apparatus 829.

Normally, the air pump 834 is caused to operate in a manner to create a low pressure in the chamber 833 whereby the flexible membrane 832 is disposed against the inside surface of the spherical casing 830 in the dotted line position illustrated by the reference numeral 846 so that the interior of the supporting means 830 can receive laundry to be washed therein in a conventional manner by the rotation of the spherical casing 830 about a horizontal axis in any suitable manner.

However, when it is desired to remove the moisture from the wet laundry 835, the rotation of the spherical member 830 is stopped in the position illustrated in FIG. 21 so that the perforations 831 are facing downwardly whereby the pump 834 is activated to create a high pressure in the chamber 833 so that the flexible membrane 832 moves downwardly from its dotted line position 846 toward the laundry to compact and compress the same between the membrane 832 and the perforations 831 to squeeze moisture therefrom and hold the electrode means 837 closely adjacent the lower electrode means 843. With the membrane 832 in its down position as illustrated in FIG. 21, the electrode means 837 and 843 cooperate together to create the nonuniform fields 845 to continuously draw moisture from the moisture-bearing material 835 until it is desired to redistribute the laundry 835 therein or remove the laundry 835 therefrom as desired.

In this manner, the laundry apparatus 829 can remain in the position illustrated in FIG. 21 during the entire moisture removing operation whereby the subsequent return of the membrane 832 to the dotted line position 846 will permit the now dried laundry 835 to be removed from the apparatus 829.

While the various laundry machines of this invention have been previously described as utilizing the electrical potential differential or electric field feature of this invention in connection with laundry-receiving supporting structure that normally rotates about a horizontal axis, it is to be understood that the various features of this invention can be utilized with laundry machines wherein the laundry supporting member is rotated generally about a vertically disposed axis.

Figure 22:
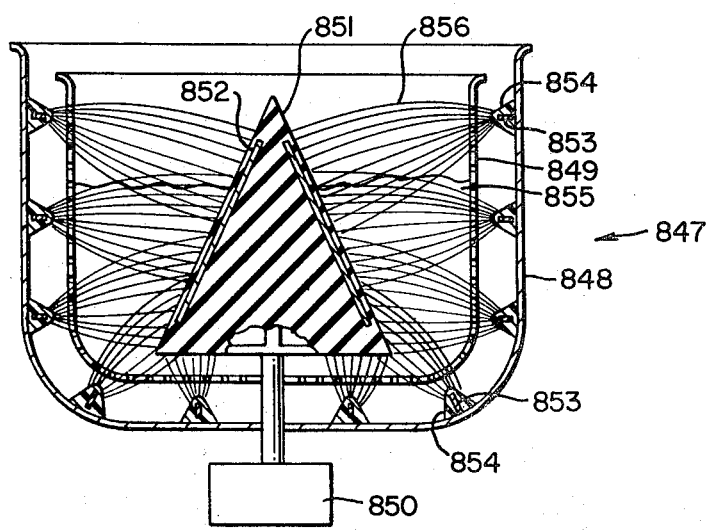
FIG. 22 is a view similar to FIG. 20 and illustrates another laundry machine of this invention, the laundry machine being of the "vertical" type.

For example, reference is now made to FIG. 22 wherein another laundry apparatus of this invention is generally indicated by the reference numeral 847 and comprises an outer stationary tub 848 having a rotatable inner perforated tub 849 disposed therein and adapted to be rotated about a vertical axis by suitable transmission means 850 in a manner well known in the art. In addition, a vertically disposed agitator 851 is disposed in the perforated tub 849 to agitate the laundry and wash and rinse water in a manner well known in the art, the agitator 851 also being controlled by the transmission means 850 in a manner conventional in the art.

However, the agitator 851 of this invention includes an annular plate-like electrode means 852 embedded therein adjacent the outer periphery thereof to cooperate with a plurality of outer knife-like or pointed electrode means 853 carried by the outer tub 848 and being insulated by suitable insulating means 854.

The operation of the laundry machine 847 will now be described.

After the laundry 855 has been washed in the apparatus 847 in a conventional manner for a vertically disposed laundry machine and the water has been drained from the tub 848 in a conventional manner, the transmission means 850 can spin the inner tub 849 about a vertical axis at a high speed to centrifuge substantially a large amount of moisture from the moisture-bearing laundry 855 whereby the laundry 855 is compacted tightly against the outer tub 849 in substantially a "doughnut" configuration and will remain in such configuration until removed by the operator or the like. At this time, the tub 849 can be held stationary and one electrical potential can be created on the outer electrode means 853 and an opposite potential on the large plate-like electrode means 852 in any suitable manner, such as by the device 840 of FIG. 21 whereby a plurality of electrostatic fields of nonuniform configuration and generally indicated by the reference numeral 856 in FIG. 22 will be created between the electrode means 852 and 853 so as to tend to cause the moisture in the moisture-bearing material 855 to move outwardly toward the higher intensity portions of the fields 856 and pass through the perforated inner tub 849 toward the outer electrode means 853 whereby the laundry 855 can be dried in the apparatus 847 in the manner previously described. If desired, the tub 849 can be rotated during the moisture removing operation to bring different portions of the laundry 855 into different portions of the fields 856.

Of course, it is to be understood that it may not be necessary to centrifuge the laundry 855 by spinning the tube 849 at a high speed because it is believed that the electrostatic principle of this invention can remove such moisture without a prior centrifuging operation.

Figure 23:
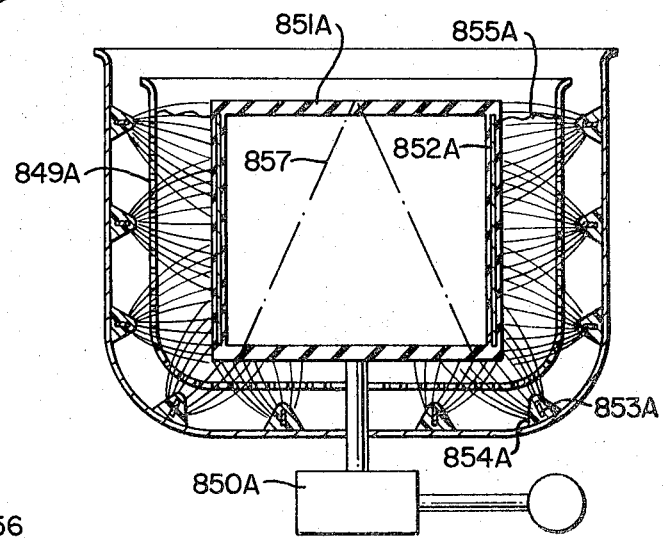
FIG. 23 is a view similar to FIG. 21 and illustrates another laundry machine of this invention, the laundry machine also being of the "vertical" type.

If it is desired to move the inner electrode means 852 of the vertical apparatus 847 closer to the outer electrode means 853 to increase the intensity of the nonuniform fields 856, the agitator 851 can be formed in the manner illustrated in FIG. 23 wherein the agitator 851A is expandable from the conventional substantially conical condition illustrated by broken line 857 in FIG. 23 to a substantially cylindrical configuration illustrated in full lines wherein the expandable conductive plate-like electrode means 852A is disposed closely adjacent the outer electrode means 853A, the expanding of the agitator 851A outwardly also compresses the laundry 855A against the inner tub 849A to squeeze water therefrom in substantially the same manner as the membrane 832 of FIG. 21 previously described.

Therefore, it can be seen that the laundry apparatus set forth in applicant's FIGS. 21–23 are each adapted to remove moisture from the laundry by the electrostatic principles of this invention wherein the non-uniform fields created between the inner and outer electrode means are so constructed and arranged that the higher intensity portion of the electrostatic fields are adjacent the collecting electrode means so as to cause the moisture in the moisture-bearing material to move toward the same and leave the moisture-bearing material without requiring a heating or conventional evaporative process in drying the laundry, even though a heating and evaporative process can be utilized with the electrode means of this invention as previously stated.

While the various apparatus of this invention have been previously described in utilizing the electrostatic feature of this invention for removing the moisture from the moisture-bearing material through the supporting means carrying the moisture-bearing material toward an electrode means disposed spaced from the supporting means, it is to be understood that the electrostatic principles of this invention can be utilized to remove the moisture from the moisture-bearing material without causing the moisture to actually leave the pass through the supporting means.

Figure 24:
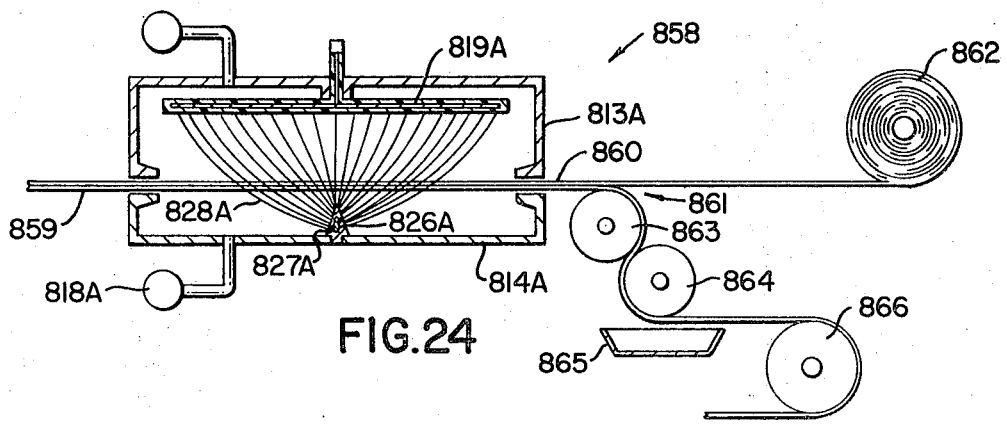
FIG. 24 is a view similar to FIG. 18 and illustrates another embodiment of this invention.

For example, reference is now made to FIG. 24 wherein another papermaking apparatus of this invention is generally indicated by the reference numeral 858 and includes upper and lower nozzle means 813A and 814A formed in the same manner as the nozzle means 813 and 814 of FIG. 18 previously described wherein the electrode means 826A and 819A create a nonuniform field 828A therebetween.

The continuously moving support means 859 passes between the nozzle means 813A and 814A and carries the moisture-bearing paper material 860 therewith toward the right, the supporting means 859 comprising moisture-absorbing material, such as felt or the like, on the upper side thereof and a moisture-impervious lower surface formed from plastic or the like for a purpose now to be described.

As the moisture-bearing material 860 and support means 859 pass through the electrostatic field 828A, the higher intensity portion of the electrostatic field 828A causes the moisture in the moisture-bearing material 860 to be driven into the moisture-absorbing upper side of the support means 859 while the moisture-impervious lower side thereof prevents the moisture from entering into the lower nozzle means 814A. In this manner, the moisture is removed from the moisture-bearing material 860 but is received in and retained in the supporting means 859 which is separated from the dried paper in the region of the reference numeral 861 whereby the dried paper 860 is drawn onto the supply roll means 862 and the support means 859 passes between a pair of squeezing rollers 863 and 864 to remove the collected moisture therefrom and be carried away by a trough means 865 or other suitable means before the support means 859 is directed back to the left by a roller means 866 to pick up more wet paper slurry 860 to be passed between the nozzle means 813A and 814A.

Of course, the support means 859 need not have a moisture-impervious material on the lower side thereof as the electrostatic field 828A could be so constructed and arranged that the same will merely cause the moisture in the moisture-bearing material 860 to enter the moisture-absorbing material 859 and be held thereby before passing out of the supporting means 859 toward the lower electrode means 826A, as the particular portion of the absorbing support means 859 has passed out of the field 828A.

Also, the moisture-absorbing material 859 could be so constructed and arranged that the same does permit the moisture collected therein to pass toward the electrode means 826A in the manner previously described to be removed from the nozzle means 814A in the manner previously described.

However, it is to be understood that if the moisture in the moisture-bearing material is drawn into the supporting means and prevented from leaving the supporting means so as to contaminate the lower electrode means, the lower electrode means 826A of FIG. 24 can be surrounded by a dry atmosphere by the pressure means 818A and never have the effective potential thereof changed by the moisture in the moisture-bearing material 860.

Figure 25:
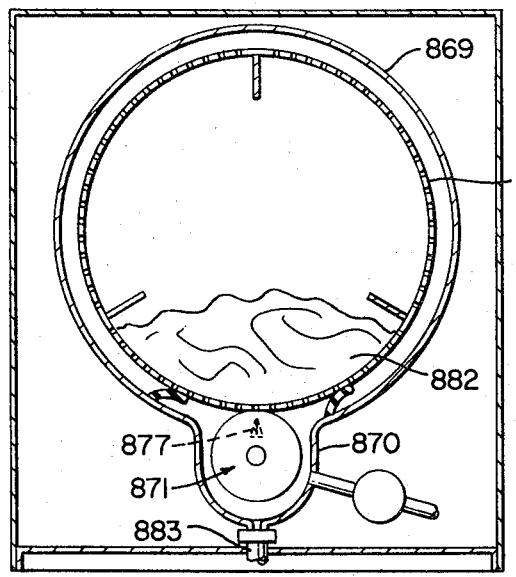
FIG. 25 is a view similar to FIG. 18 and illustrates another embodiment of this invention.
Figure 27:
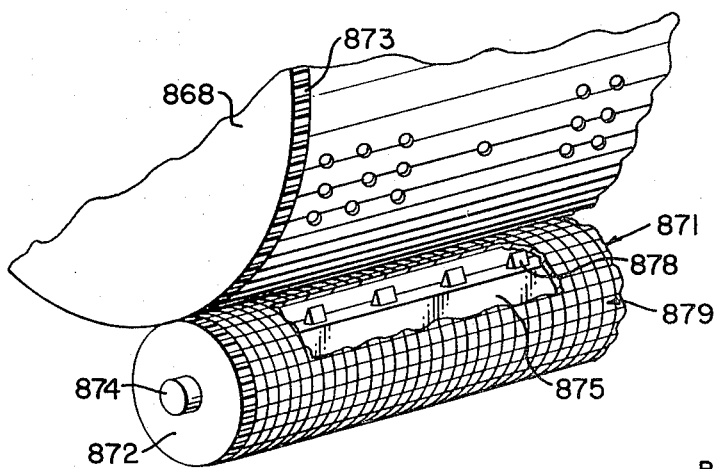
FIG. 27 is a perspective view of the parts of FIG. 26.

Similarly, another laundry apparatus of this invention is generally indicated by the reference numeral 867 in FIG. 25 and comprises a rotatable foraminous drum 868 mounted in a water-retaining drum or casing 869 having a lower cavity 870 receiving a rotatable and cylindrical moisture-collecting means 871 of this invention adapted to be rotated in unison with the drum 868 through either cooperating gear means or by friction as desired. However, as illustrated in FIG. 27, the collecting drum means 871 has pinion gear means 872 on the outer ends thereof disposed in meshing relation with pinion gear means 873 on the outer ends of the rotatable drum 868 so as the drum means 868 is driven in one direction in a conventional manner, the rotation of the drum means 868 causes rotation of the collecting means 871 about stationary shaft means 874 carried by the outer tub 869 and being secured to a support means 875 inside the collector drum 871. The support means 875 therefore remains stationary as the outer portion 876 of the collector means 871 is rotated, the support means 875 carrying a plurality of knife-like or pointed electrode means 877 suitably insulated by insulating material 878 or noninsulated as desired as no moisture can reach the electrode means 877.

Figure 26:
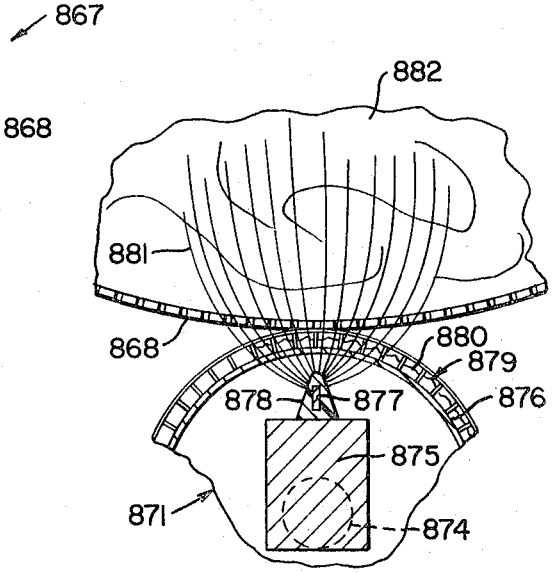
FIG. 26 is an enlarged, fragmentary cross-sectional view of the apparatus of FIG. 25.

In particular, the outer portion 876 of the collector means 871 can be formed of insulating material and can have a plurality of pockets 879 formed on the outer surface thereof adapted to receive moisture therein as illustrated by the reference numeral 880 in FIG. 26.

By creating one electrical potential on the electrode means 877 and an opposite potential on the inner drum 868 in the manner previously described or on the other internal electrode means mounted within the rotatable drum 868, nonuniform fields 881 are provided as illustrated in FIG. 6 which tend to cause the moisture in the moisture-bearing laundry 882 to pass through the perforated drum 868 into the pockets 879 as illustrated in FIG. 26 and be carried by the pockets 880 from above the electrode means 877 down below the same and out of the force of attraction of the fields of the electrode means 877 whereby the moisture 880 is dumped from the pockets 879 into the chamber 870 to be drained therefrom by conventional draining means 883.

Therefore, it can be seen that the laundry apparatus 867 of FIGS. 25–27 causes the moisture in the moisture-bearing material to be drawn therefrom and be collected in the collecting means 871 in such a manner that the collecting means 871 carries the collected moisture away from the electric field means created by the electrode means 877 into a position over the drain 883 so that the moisture 880 can drop out of the pockets 879 to be carried away at the drain 883.

If desired, the supporting means in the various embodiments of this invention can be formed of conductive material or nonconductive material and if conductive, can be grounded, charged or insulated from ground depending on the desired results of the field force characteristics produced thereby.

Thus, it can be seen that the various principles of this invention can be utilized to dry moisture-bearing material, whether the same be laundry, paper, pellets, etc., by causing the moisture thereof to pass through the supporting means toward an electrode means or pass into a supporting means to be carried away by the supporting means as desired.

While the forms of the invention now preferred have been disclosed as required by the statutes, other forms may be used, all coming within the scope of the claims which follow.

What is claimed is:

1. In an apparatus for removing moisture from moisture bearing material, the improvement comprising support means for supporting said moisture bearing material on one side of said support means, and electrode means disposed adjacent said support means for creating a nonuniform electric field across at least part of said support means with at least said part of said support means traversing said nonuniform field in the region of the higher intensity portion of said nonuniform field to cause at least part of said moisture in said moisture bearing material that is disposed in said field by said support means to leave said moisture bearing material and move toward the higher intensity portion of said nonuniform field.

2. In an apparatus as set forth in claim 1, the further improvement comprising means for causing relative movement between said support means and said electrode means to cause different portions of said moisture bearing material to be subjected to said action of said nonuniform field.

3. In an apparatus as set forth in claim 1, the further improvement wherein said electrode means is disposed adjacent said support means on the other side thereof and comprising another electrode means disposed adjacent said one side of said support means and cooperating with said first-named electrode means to create said nonuniform field therebetween.

4. In an apparatus as set forth in claim 3, the further improvement comprising means for creating one potential on said first-named electrode means and an opposite potential on said other electrode means to produce said nonuniform field.

5. In an apparatus as set forth in claim 4, said means for creating said potentials on said electrode means comprising means for creating said potentials in an alternating manner.

6. In an apparatus as set forth in claim 3, the further improvement comprising means for causing relative movement between said support means and said electrode means to cause different portions of said moisture bearing material to be disposed in said nonuniform field.

7. In an apparatus as set forth in claim 1, said support means being nonconductive.

8. In an apparatus as set forth in claim 1, said support means being a rotatable drum mounted for rotation about a generally horizontal axis with said moisture bearing material being disposed therein.

9. In an apparatus as set forth in claim 1, said support means being a rotatable tub mounted for rotation about a generally vertical axis with said moisture bearing material being disposed therein.

10. In an apparatus as set forth in claim 1, said support means being a movable belt means with said moisture bearing material supported thereon.

11. In a method for removing moisture from moisture bearing material, the improvement comprising the steps of supporting said moisture bearing material on one side of a support means, disposing electrode means adjacent said support means, and creating a nonuniform electric field across at least part of said support means with said electrode means so that at least said part of said support means traverses said nonuniform field in the region of the higher intensity portion of said nonuniform field to cause at least part of said moisture in said moisture bearing material that is disposed in said field by said support means to leave said moisture bearing material and move toward the higher intensity portion of said nonuniform field.

12. In a method as set forth in claim 11, the further improvement comprising the step of causing relative movement between said support means and said electrode means to cause different portions of said moisture bearing material to be subjected to said action of said nonuniform field.

13. In a method as set forth in claim 11, the further improvement wherein the step of disposing said electrode means comprises the step of disposing said electrode means adjacent said support means on the other side thereof and comprising the step of disposing another electrode means adjacent said one side of said support means, said step of creating said nonuniform field between said other electrode means and said first-named electrode means.

14. A method as set forth in claim 13, the further improvement comprising the step of creating one potential on said first-named electrode means and an opposite potential on said other electrode means to produce said nonuniform field.

15. In a method as set forth in claim 13, said step for creating said potentials on said electrode means creating said potentials in an alternating manner.

16. In a method as set forth in claim 13, the further improvement comprising the step of causing relative movement between said support means and said electrode means to cause different portions of said moisture bearing material to be disposed in said nonuniform field.

17. In a method as set forth in claim 1, the further improvement comprising the step of forming said support means from nonconductive material.

18. In a method as set forth in claim 11, the further improvement comprising the steps of forming said support means from a rotatable drum, and mounting said drum for rotation about a generally horizontal axis with said moisture bearing material being disposed therein.

19. In a method as set forth in claim 11, the further improvement comprising the steps of forming said support means from a rotatable tub, and mounting said rotatable tub for rotation about a generally vertical axis with said moisture bearing material being disposed therein.

20. In a method as set forth in claim 11, the further improvement comprising the step of forming said support means from a movable belt means with said moisture bearing material being supported thereon.

21. In an apparatus for removing moisture from moisture bearing material, the improvement comprising support means for supporting said moisture bearing material on one side of said support means, at least said one side of said support means having means for receiving and holding moisture therein, and electrode means disposed adjacent said support means, said electrode means having an electrical potential that causes at least part of the moisture of said moisture bearing material to leave said moisture bearing material and be received in said receiving and holding means of said support means.

22. In an apparatus as set forth in claim 21, means for creating an electrical potential on at least part of said moisture of said moisture bearing material that is opposite to said electrical potential of said electrode means.

23. In an apparatus as set forth in claim 21, said support means being moisture absorbing material.

24. In an apparatus as set forth in claim 21, said support means being formed of electrical insulating material and having means for preventing said moisture received thereby from reaching said electrode means.

25. In an apparatus as set forth in claim 21, means for causing relative movement between said support means and said electrode means to cause different portions of said moisture bearing material to be subject to the action of said electrical potential of said electrode means.

26. In an apparatus as set forth in claim 21, another electrode means disposed spaced from said first-named electrode means and having an electrical potential that cooperates with said first-named electrode means to create a non-uniform field therebetween with the higher intensity field being adjacent said first-named electrode means.

27. In a method for removing moisture from moisture bearing material, the improvement comprising the steps of supporting said moisture bearing material on one side of a support means that has means for receiving and holding moisture therein, and disposing an electrode means adjacent said support means so that an electrical potential on said electrode means causes at least part of the moisture of said moisture bearing material to leave said moisture bearing material and be received in said receiving and holding means of said support means.

28. In an apparatus for removing moisture from moisture bearing material, the improvement comprising support means for supporting said moisture bearing material on one side of said support means, electrode means disposed adjacent the other side of said support means, said electrode means having an electrical potential that causes at least part of said moisture of said moisture bearing material to leave said moisture bearing material and move to the other side of said support means and go toward said electrode means, and moisture collecting means disposed between said other side of said support means and said electrode means to collect the removed moisture and prevent it from reaching said electrode means.

29. In an apparatus as set forth in claim 28, means for removing the moisture from said collecting means so that said collecting means can receive more removed moisture.

30. In an apparatus as set forth in claim 28, means for moving said collecting means between said other side of said support means and said electrode means to move the collected moisture out of the influence of said electrode means.

31. In an apparatus as set forth in claim 30, said collecting means comprising a rotatable member.

32. In a method for removing moisture from moisture bearing material, the improvement comprising the steps of supporting said moisture bearing material on one side of a support means, disposing an electrode means adjacent the other side of said support means so that an electrical potential on said electrode means causes at least part of the moisture of said moisture bearing material to leave said moisture bearing material and move to the other side of said support means and go toward said electrode means, and collecting said removed moisture between said other side of said support means and said electrode means with moisture collecting means to prevent said removed moisture from reaching said electrode means.

References Cited
UNITED STATES PATENTS 3,405,452  10/1968  Candor et al. _____ 34—1

CHARLES SUKALO, Primary Examiner

Dedication 3,543,408.—*Robert R. Candor*, Miami Township and *James T. Candor*, Washington Township, Ohio. LIQUID REMOVING APPARATUS AND METHOD. Patent dated Dec. 1, 1970. Dedication filed Oct. 17, 1980, by the inventor.

Hereby dedicates to the Public the entire term of said patent.

[*Official Gazette January 6, 1981.*]